(12) United States Patent
Ooma et al.

(10) Patent No.: US 6,934,144 B2
(45) Date of Patent: Aug. 23, 2005

(54) CAPACITOR AND METHOD OF MANUFACTURING THE SAME

(75) Inventors: Shigeki Ooma, Nakai-machi (JP);
Hiroyuki Watanabe, Nakai-machi (JP);
Chikara Manabe, Nakai-machi (JP);
Masaki Hirakata, Nakai-machi (JP);
Kentaro Kishi, Nakai-machi (JP);
Taishi Shigematsu, Nakai-machi (JP);
Miho Watanabe, Nakai-machi (JP);
Takashi Isozaki, Nakai-machi (JP);
Shinsuke Okada, Nakai-machi (JP);
Kazunori Anazawa, Nakai-machi (JP)

(73) Assignee: Fuji Xerox Company, Limited, Tokyo (JP)

( * ) Notice: Subject to any disclaimer, the term of this patent is extended or adjusted under 35 U.S.C. 154(b) by 0 days.

(21) Appl. No.: 10/894,021

(22) Filed: Jul. 20, 2004

(65) Prior Publication Data
US 2005/0083635 A1 Apr. 21, 2005

(30) Foreign Application Priority Data
Oct. 17, 2003 (JP) ..................................... 2003-357553

(51) Int. Cl.[7] .............................................. H01G 4/005
(52) U.S. Cl. ..................... 361/303; 361/508; 361/528; 29/25.03
(58) Field of Search ................. 361/303, 502, 361/508–509, 528–529, 516, 532; 29/25.03

(56) References Cited

U.S. PATENT DOCUMENTS

| | | | | |
|---|---|---|---|---|
| 3,652,902 A | * | 3/1972 | Hart et al. ................... | 361/502 |
| 4,810,599 A | * | 3/1989 | Kondo et al. ................ | 429/323 |
| 5,773,834 A | * | 6/1998 | Yamamoto et al. ........ | 250/423 F |

FOREIGN PATENT DOCUMENTS

| | | |
|---|---|---|
| JP | A 2002-503204 | 1/2002 |
| JP | A 2003-168630 | 6/2003 |
| WO | WO 97/32571 | 9/1997 |

OTHER PUBLICATIONS

Lyubchenko et al., "Atomic force microscopy of DNA and bacteriophage in air, water and propanol: the role of adhesion forces," Nucleic Acids Research, vol. 21, No. 5, pp 1117–1123, 1993.

* cited by examiner

Primary Examiner—Anthony Dinkins
(74) Attorney, Agent, or Firm—Oliff & Berridge, PLC

(57) ABSTRACT

To provide a capacitor capable of utilizing carbon nanotube characteristics effectively to obtain excellent electric or mechanical characteristics, and a method of manufacturing the same. The capacitor is characterized by including two opposing electrodes, at least one of the two electrodes being formed from a coating film of a carbon nanotube structure in which plural carbon nanotubes with functional groups bonded constitute a mesh structure by cross-linking the functional groups through chemical bonding. The method of manufacturing a capacitor includes: a coating step for coating a surface of a base body with a solution that contains plural carbon nanotubes with functional groups bonded; and a cross-linking step for forming a carbon nanotube structure layer in which the functional groups are chemically bonded to one another, thereby causing the carbon nanotubes to cross-link to one another and build a mesh structure.

33 Claims, 7 Drawing Sheets

Fig. 2
(a)
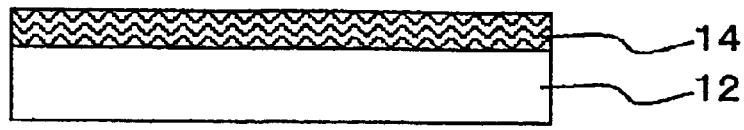
(b)
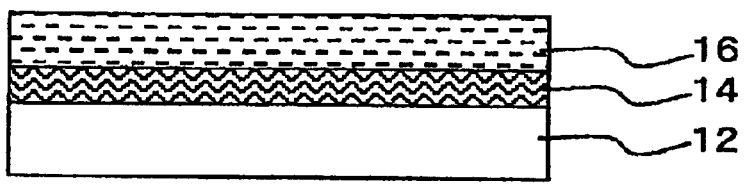
(c)
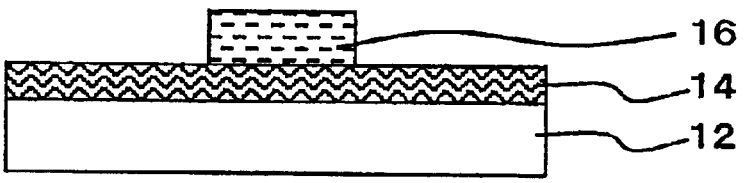
(d)
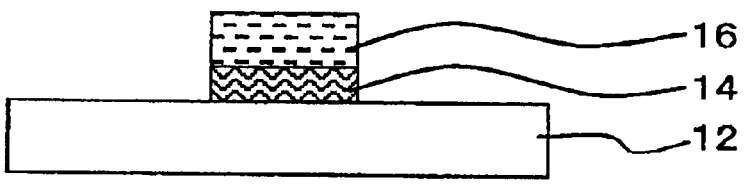
(e)

REACTION SCHEME FOR METHYL ESTERIFICATION OF CARBON NANOTUBE CARBOXYLIC ACID

REACTION SCHEME FOR POLYMERIZATION OF CARBON NANOTUBE CARBOXYLIC ACID METHYL ESTER AND GLYCERIN BY ESTER EXCHANGE

CAPACITOR AND METHOD OF MANUFACTURING THE SAME

FIELD OF THE INVENTION AND RELATED ART STATEMENT

The present invention relates to a capacitor using a carbon nanotube structure and to a method of manufacturing the capacitor.

Carbon nanotubes (CNTs), with their unique shapes and characteristics, are being considered for various applications. A carbon nanotube has a tubular shape of one-dimensional nature which is obtained by rolling one or more graphene sheets composed of six-membered rings of carbon atoms into a tube. A carbon nanotube which is formed from one graphene sheet is called a single-wall nanotube (SWNT) while a carbon nanotube which is formed from plural graphene sheets is called a multi-wall nanotube (MWNT). SWNTs are about 1 nm in diameter whereas multi-wall carbon nanotubes measure several tens nm in diameter, and both are far thinner than their predecessors, which are called carbon fibers.

One of the characteristics of carbon nanotubes resides in that the aspect ratio of length to diameter is very large since the length of carbon nanotubes is on the order of micrometers. Carbon nanotubes are unique in their extremely rare nature of being both metallic and semiconductive because six-membered rings of carbon atoms in carbon nanotubes are arranged into a spiral. In addition, the electric conductivity of carbon nanotubes is very high and allows a current flow at a current density of 100 MA/cm$^2$ or more.

Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. In addition, the carbon nanotubes have high elasticity and resiliency resulting from their cage structure. Having such various and excellent characteristics, carbon nanotubes are very appealing as industrial materials.

Applied researches that exploit the excellent characteristics of carbon nanotubes have been heretofore made extensively. To give a few examples, a carbon nanotube is added as a resin reinforcer or as a conductive composite while another research utilizes a carbon nanotube as a probe of a scanning probe microscope. Carbon nanotubes have also been utilized as minute electron sources, field emission electronic devices, and flat displays. An application that is being developed is to use a carbon nanotube as a hydrogen storage.

Of those various applications of carbon nanotubes, applications as electronic materials and electronic devices are particularly attracting attention.

For instance, JP 2003-168630 A discloses a capacitor using CNTs. However, these carbon nanotubes are merely in contact with one another in a parent material and it is therefore difficult for the carbon nanotubes to provide stable electric conductivity and exercise their ability to the fullest. If the carbon nanotubes are isolated from one another in the parent material, the carbon nanotubes merely act as conductive fillers and the capacitor cannot take full advantage of the carbon nanotube characteristics that are originated from their graphene sheet structure, such as electric conductivity and mechanical strength.

Conventionally, capacitors used in electric circuits have been electrolytic capacitors, ceramic capacitors, and the like. Those conventional capacitors do not have sufficient frequency characteristics, which have to be improved by forming an electrode from a conductive polymer or by other methods. It still leaves the conventional capacitors lacking in mobility. In addition, the conventional capacitors are manufactured by an intricate process and demand very laborious handling.

If a carbon nanotube electrode is used instead of a conductive polymer electrode, the much superior electric conductivity of carbon nanotubes will lower the equivalent series resistance (ESR) and improve the frequency characteristics.

SUMMARY OF THE INVENTION

It is difficult to use a carbon nanotube as it is for an electrode, and a practical way to obtain a carbon nanotube electrode would be to form a carbon nanotube into a film. A carbon nanotube film can be obtained by dispersing carbon nanotubes in resin and then solidifying or coating the resin, or employing any other method to turn the resin into a film. However, when a carbon nanotube film obtained by this method is applied to a multilayer electrode of a multilayer capacitor, the obtained uniformity is poor and the electrode cannot meet the reproducibility required of a conductor. Therefore, a carbon nanotube film formed by the above method does not make a good multilayer electrode.

The present invention has been made to solve the above-described problem of prior art and provides a capacitor capable of utilizing carbon nanotube characteristics effectively to obtain excellent electric or mechanical characteristics.

The present invention solves the problem of prior art by presenting a capacitor that is characterized by including two opposing electrodes, at least one of the two electrodes being formed from a coating film of a carbon nanotube structure in which plural carbon nanotubes with functional groups bonded constitute a mesh structure by cross-linking the functional groups through chemical bonding.

Since the capacitor of the present invention uses, for one or both of opposing electrodes, a strand of a carbon nanotube structure in which plural carbon nanotubes constitute a mesh structure through cross-linked sites, electric conduction provided by the carbon nanotubes is stable unlike when a capacitor uses for its electrode a film that is merely filled with carbon nanotubes and has unstable electric characteristics dependent on how well the carbon nanotubes are in contact with one another.

The carbon nanotube structure is preferably formed by curing a solution containing plural carbon nanotubes to which functional groups are bonded to thereby chemically bond together the plural functional groups bonded to the carbon nanotubes to form a cross-linked site.

Of those, a first structure preferable as the cross-linked site is a structure obtained by cross-linking together the plural functional groups with a cross-linking agent in the solution. More preferably, the cross-linking agent is not self-polymerizable.

If the carbon nanotube structure is formed by curing a solution as described above, the cross-linked site in which the carbon nanotubes cross-link each other can form a cross-linked structure in which residues of the functional groups remaining after the cross-linking reaction are connected to each other with a connecting group that is a residue remaining after the cross-linking reaction of the cross-linking agent.

If the cross-linking agent has a property of polymerizing with other cross-linking agents (self-polymerizability), the connecting group contains a polymer in which two or more cross-linking agents are connected to each other in some cases. In such cases, a substantial density of the carbon nanotubes in the carbon nanotube structure decreases, and sufficient electric conductivity and mechanical strength as a capacitor may not be obtained.

On the other hand, if the cross-linking agent is not self-polymerizable, a gap between each of the carbon nanotubes can be controlled to a size of a cross-linking agent residue used. Therefore, a desired network structure of carbon nanotubes can be obtained with high duplicability. Further, reducing the size of the cross-linking agent residue can extremely narrow a gap between each of the carbon nanotubes both electrically and physically. In addition, carbon nanotubes in the structure can be densely structured.

Therefore, if the cross-linking agent is not self-polymerizable, the carbon nanotube structure of the present invention can exhibit inherent electrical characteristics or mechanical characteristics of the carbon nanotubes in an extremely high level. In the present invention, the term "self-polymerizable" refers to a property of which the cross-linking agents may prompt a polymerization reaction with each other in the presence of other components such as water or in the absence of other components. On the other hand, the term "not self-polymerizable" means that the cross-linking agent has no such a property.

If a cross-linking agent which is not self-polymerizable is selected as the cross-linking agent, a cross-linked site, where carbon nanotubes in the coat of the present invention are mutually cross-linked, has primarily an identical cross-linking structure. Furthermore, the connecting group preferably employs a hydrocarbon as its skeleton, and the number of carbon atoms of the skeleton is preferably 2 to 10. Reducing the number of carbon atoms can shorten the length of a cross-linked site and sufficiently narrow a gap between carbon nanotubes as compared to the length of a carbon nanotube itself. As a result, a carbon nanotube structure of a network structure composed substantially only of carbon nanotubes can be obtained.

Examples of the functional group include —OH, —COOH, —COOR (where R represents a substituted or unsubstituted hydrocarbon group), —COX (where X represents a halogen atom), —$NH_2$, and —NCO. A selection of at least one functional group selected from the group consisting of the above functional groups is preferable, and in such a case, a cross-linking agent, which may prompt a cross-linking reaction with the selected functional group, is selected as the cross-linking agent.

Further, examples of the preferable cross-linking agent include a polyol, a polyamine, a polycarboxylic acid, a polycarboxylate, a polycarboxylic acid halide, a polycarbodiimide, and a polyisocyanate. A selection of at least one cross-linking agent selected from the group consisting of the above cross-linking agents is preferable, and in such a case, a functional group, which may prompt a cross-linking reaction with the selected cross-linking agent, is selected as the functional group.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Examples of the particularly preferable functional group include —COOR (where R represents a substituted or unsubstituted hydrocarbon group). Introduction of a carboxyl group into carbon nanotubes is relatively easy, and the resultant substance (a carbon nanotube carboxylic acid) is highly reactive. Therefore, after the formation of the substance, it is relatively easy to esterify the substance to convert its functional group into —COOR (where R represents a substituted or unsubstituted hydrocarbon group), and such a functional group easily prompts a cross-linking reaction and is suitable for formation of a coat.

A polyol can be exemplified as the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to an environment.

In the cross-linked site in which plural carbon nanotubes mutually cross-link, the functional group is —COOR (where R represents a substituted or unsubstituted hydrocarbon group). The cross-linked site is —COO($CH_2$)$_2$OCO— in the case where ethylene glycol is used as the cross-linking agent. In the case where glycerin is used as the cross-linking agent, the cross-linked site is —COOCH$_2$CHOHCH$_2$OCO— or —COOCH$_2$CH(OCO—)CH$_2$OH— if two OH groups contribute to the cross-linking, and the cross-linked site is —COOCH$_2$CH(OCO—)CH$_2$OCO— if three OH groups contribute to the cross-linking. The chemical structure of the cross-linked site may be a chemical structure selected from the group consisting of the above four structures.

A second structure preferable as the structure of the cross-linked site is a structure formed by chemical bonding of plural functional groups. More preferably, a reaction that causes the chemical bonding is any one of dehydration condensation, a substitution reaction, an addition reaction, and an oxidative reaction.

In the carbon nanotube structure, carbon nanotubes form a cross-linked site by chemically bonding together functional groups bonded to the carbon nanotubes, to thereby form a network structure. Therefore, the size of the cross-linked site for bonding the carbon nanotubes becomes constant depending on the functional group to be bonded. Since a carbon nanotube has an extremely stable chemical structure, there is a low possibility that functional groups or the like excluding a functional group to modify the carbon nanotube are bonded to the carbon nanotube. In the case where the functional groups are chemically bonded together, the designed structure of the cross-linked site can be obtained, and the carbon nanotube structure can be homogeneous.

Furthermore, the functional groups are chemically bonded together, so that the length of the cross-linked site between the carbon nanotubes can be shorter than that in the case where the functional groups are cross-linked with a cross-linking agent. Therefore, the carbon nanotube structure is dense, and tends to readily produce an effect peculiar to a carbon nanotube.

In the carbon nanotube structure of the present invention to be used as an electrode, plural carbon nanotubes form a network structure via multiple cross-linked sites. As a result, excellent characteristics of a carbon nanotube can be stably utilized unlike a material such as a mere carbon nanotube dispersion film or a resin dispersion film in which carbon nanotubes accidentally contact each other and are substantially isolated from each other.

The chemical bonding of plural functional groups is preferably one selected from —COOCO—, —O—, —NHCO—, —COO—, and —NCH— in a condensation reaction. The chemical bonding is preferably at least one selected from —NH—, —S—, and —O— in a substitution reaction. The chemical bonding is preferably —NHCOO— in an addition reaction. The chemical bonding is preferably —S—S— in an oxidative reaction.

Examples of the functional group to be bonded to a carbon nanotube prior to the reaction include —OH—, —COOH, —COOR (where R represents a substituted or unsubstituted hydrocarbon group), —X, —COX (where X represents a halogen atom), —SH, —CHO, —OSO$_2$CH$_3$, —OSO$_2$(C$_6$H$_4$)CH$_3$—NH$_2$, and —NCO. It is preferable to select at least one functional group from the group consisting of the above functional groups.

Particularly preferable examples of the functional group include —COOH. A carboxyl group can be relatively easily introduced into a carbon nanotube. In addition, the resultant substance (a carbon nanotube carboxylic acid) is highly reactive, easily causes a condensation reaction by using a dehydration condensation agent such as N-ethyl-N'-(3-dimethylaminopropyl)carbodiimide, and is thus suitable for forming a coat.

The plural carbon nanotubes are preferably multi-wall carbon nanotubes, which have high electric conductivity, from the viewpoint of enhancing the electric conductance of the capacitor. Multi-wall carbon nanotubes are also less subject to damage to the graphene sheet structure of inner walls when functional groups are bonded, and therefore are preferable from the viewpoint of slowing down degradation of characteristics unique to carbon nanotubes.

(Manufacture Method)

According to the present invention, a method of manufacturing a capacitor that has two opposing electrodes includes: a coating step for coating a surface of a base body with a solution that contains plural carbon nanotubes with functional groups bonded; and a cross-linking step for forming a carbon nanotube structure layer in which the functional groups are chemically bonded to one another, thereby causing the carbon nanotubes to cross-link to one another and build a mesh structure, and is characterized in that the carbon nanotube structure layer constitutes one or both of the opposing electrodes.

In the present invention, first, in the step of coating a substrate with a solution containing plural carbon nanotube having functional groups (hereinafter, referred to as "cross-linking application liquid" in some cases), the whole surface of the substrate or a part of the surface of the substrate is coated with the solution. Then, in the subsequent cross-linking step, the solution after the coating is cured to form a carbon nanotube structure in which the plural carbon nanotubes mutually cross-link via chemical bonding of the functional groups to construct a network structure. Passing those two steps can stabilize the structure itself of the carbon nanotube structure on the substrate, so that the structure is used as at least one of a pair of opposing electrodes.

In forming chemical bonding between functional groups, a first method preferable for forming a cross-linked site is a method of cross-linking the functional groups with a cross-linking agent in the solution. More preferably, the cross-linking agent is not self-polymerizable.

In the method of manufacturing a capacitor of the present invention, examples of the functional group for forming the cross-linked site using the cross-linking agent include —OH, —COOH, —COOR (where R represents a substituted or unsubstituted hydrocarbon group), —COX (where X represents is a halogen atom), —NH$_2$, and —NCO. A selection of at least one functional group from the group consisting of the above functional groups is preferable, and in such a case, a cross-linking agent, which may prompt a cross-linking reaction with the selected functional group, is selected as the cross-linking agent.

Further, examples of the preferable cross-linking agent include a polyol, a polyamine, a polycarboxylic acid, a polycarboxylate, a polycarboxylic acid halide, a polycarbodiimide, and a polyisocyanate. A selection of at least one cross-linking agent from the group consisting of the above cross-linking agents is preferable, and in such a case, a functional group, which may prompt a cross-linking reaction with the selected cross-linking agent, is selected as the functional group.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Particularly preferable examples of the functional group include —COOR (where R represents a substituted or unsubstituted hydrocarbon group). A carboxyl group can be relatively easily introduced into a carbon nanotube, and the resultant substance (a carbon nanotube carboxylic acid) is highly reactive. Therefore, after the formation of the substance, it is relatively easy to esterify the substance to convert its functional group into —COOR (where R represents a substituted or unsubstituted hydrocarbon group). The functional group easily causes a cross-linking reaction, and is suitable for the formation of the coat.

In addition, a polyol may be the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to an environment.

Further, a second preferable method of forming a cross-linked site is a method of chemically bonding plural functional groups together.

From the above, the size of the cross-linked site, which bonds the carbon nanotubes together, becomes constant depending on the functional group to be bonded. A carbon nanotube has an extremely stable chemical structure, so that a possibility of bonding of functional groups or the like excluding the functional groups intended for a modification, is low. When chemically bonding the functional groups together, the designed structure of the cross-linked site can be obtained, providing a homogeneous carbon nanotube structure.

Further, functional groups are chemically bonded together and thus the length of the cross-linked site between the carbon nanotubes can be shortened compared to the case of cross-linking the functional groups together using a cross-linking agent. Therefore, the carbon nanotube structure becomes dense, and effects peculiar to carbon nanotubes are easily obtained.

Examples of a particularly preferable reaction, which chemically bonds the functional groups together, include a condensation reaction, a substitution reaction, an addition reaction, and an oxidative reaction.

In a method of manufacturing a capacitor of the present invention, the preferable functional group includes: at least one functional group selected from the group consisting of —COOR (where R represents a substituted or unsubstituted hydrocarbon group), —COOH, —COX (where X represents is a halogen atom), —OH, —CHO—, and —$NH_2$ for the condensation reaction; at least one functional group selected from the group consisting of —$NH_2$, —X (where X represents is a halogen atom), —SH, —OH, —$OSO_2CH_3$, and —$OSO_2(C_6H_4)CH_3$ for the substitution reaction; at least one functional group selected from the group consisting of —OH and —NCO for the addition reaction; and —SH for the oxidative reaction.

In particular, in the method of manufacturing a capacitor of the present invention, a molecule containing the functional groups may be bonded to carbon nanotubes to be chemically bonded at the exemplified functional group portion to construct the cross-linked site.

If the reaction is dehydration condensation, a condensation agent is preferably added. Further, the preferable functional group is at least one functional group selected from the group consisting of —COOR (where R represents a substituted or unsubstituted hydrocarbon group), —COOH, —COX (where X represents is a halogen atom), —OH, —CHO, and —$NH_2$.

For example, —COOH is particularly preferably used as the functional group specifically used for the condensation reaction. Introduction of a carboxyl group into carbon nanotubes is relatively easy. Moreover, the resultant substance (a carbon nanotube carboxylic acid) is highly reactive. Therefore, introduction of functional groups for forming a network structure into plural places of one carbon nanotube is easy. In addition, the functional group easily prompts in a condensation reaction, thus being suitable for the formation of the carbon nanotube structure.

In a capacitor manufacturing method of the present invention, the solution used in the coating step may contain a solvent or the cross-linking agent may double as a solvent of the solution depending on the type of the cross-linking agent.

BRIEF DESCRIPTION OF THE DRAWINGS

In the accompanying drawings:

FIGS. 2A to 2E are schematic sectional views of a base body surface showing step by step an example of a semiconductor device manufacturing method of the present invention;

DETAILED DESCRIPTION OF THE PREFERRED EMBODIMENT

A specific description will be given below on the present invention through an embodiment in which a capacitor and a method of manufacturing the capacitor are described separately.

[Capacitor]

A capacitor of this embodiment is characterized in that one of two opposing electrodes is formed from a coating film of a carbon nanotube structure in which plural carbon nanotubes cross-link one another to build a mesh structure. For the structure of the capacitor and other components than the electrodes (for example, a dielectric layer), known techniques can be employed and accordingly detailed descriptions thereof are omitted.

Figure 1:
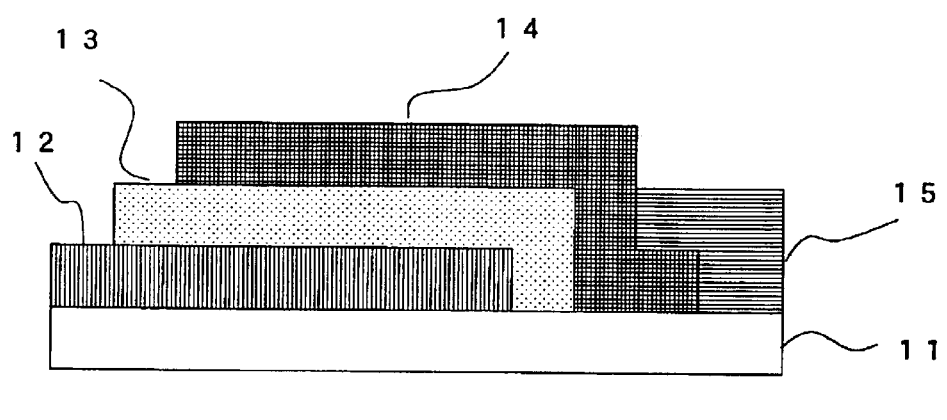
FIG. 1 is a schematic diagram of a capacitor mode according to the present invention.

FIG. 1 shows an example of the structure of a capacitor 1. The capacitor 1 of this embodiment has an aluminum lower electrode 12, a ferroelectric layer 13, and a nanotube structure 14 layered on an insulating base body 11. The nanotube structure 14 serves as an upper electrode.

The base body for supporting the capacitor 1 is not limited to any particular material but preferably has an insulating ability. As will be described later, the base body may also be flexible or pliable since a flexible or pliable base body does not lessen the ease of manufacturing.

The lower electrode 12 may be formed from a coating film of a carbon nanotube structure as is the upper electrode 14. However, when the material of the base body 11 is one that adheres poorly to a coating film of a carbon nanotube structure, forming the lower electrode 12 from a metal film may be preferred.

Having a cross-linking structure, the carbon nanotube structure layer formed on the base body hardly breaks when the capacitor is bent and deformed. The performance of the device is therefore degraded less by deformation. A flexible or pliable substrate that has an insulating ability can be obtained from resin such as polyethylene, polypropylene, polyvinyl chloride, polyamide, and polyimide.

<Carbon Nanotube Structure>

In the present invention, the phrase "carbon nanotube structure" to be used as an electrode of a capacitor refers to a member in which plural carbon nanotubes mutually cross-link to construct a network structure. Provided that a carbon nanotube structure can be formed in such a manner that carbon nanotubes mutually cross-link to construct a network structure, the carbon nanotube structure may be formed by any method. However, production according to a method of manufacturing a capacitor of this embodiment to be described later can be readily performed and can provide a high-performance capacitor. Moreover, uniformization and control of characteristics can be readily performed.

A first structure for the carbon nanotube structure used as an electrode of a capacitor manufactured by a method of manufacturing a capacitor to be described later is manufactured by curing a solution (cross-linking application liquid) containing a carbon nanotube having a functional group and a cross-linking agent that causes a cross-linking reaction with the functional group to cause a cross-linking reaction between the functional group of the carbon nanotube and the cross-linking agent to thereby form a cross-linked site. Furthermore, a second structure for the carbon nanotube structure is manufactured by chemically bonding functional groups of carbon nanotubes to form cross-linked sites.

Hereinafter, the carbon nanotube structure layer in the capacitor of this embodiment will be described by way of examples of the manufacturing method. Unless otherwise stated, the structures of cross-linked sites are not considered.

(Carbon Nanotube)

Carbon nanotubes, which are the main component in the present invention, may be single-wall carbon nanotubes or multi-wall carbon nanotubes each having two or more layers. Whether one or both types of carbon nanotubes are used (and, if only one type is to be used, which type is selected) may be decided appropriately taking into consideration the use and characteristics of the capacitor or the cost.

Carbon nanotubes in the present invention include ones that are not exactly shaped like a tube, such as: a carbon nanohorn (a horn-shaped carbon nanotube whose diameter continuously increases from one end toward the other end) which is a variant of a single-wall carbon nanotube; a carbon nanocoil (a coil-shaped carbon nanotube forming a spiral when viewed in entirety); a carbon nanobead (a spherical bead made of amorphous carbon or the like with its center pierced by a tube); a cup-stacked nanotube; and a carbon nanotube with its circumference covered with a carbon nanohorn or amorphous carbon.

Furthermore, carbon nanotubes that can be used in the present invention may be ones that contain some substances inside, such as: a metal-containing nanotube which is a carbon nanotube containing metal or the like; and a peapod nanotube which is a carbon nanotube containing a fullerene or a metal-containing fullerene.

As described above, in the present invention, it is possible to employ carbon nanotubes of any mode, including common carbon nanotubes, variants of common carbon nanotubes, and carbon nanotubes with various modifications, without a problem in terms of reactivity. Therefore, the concept of "carbon nanotube" in the present invention encompasses all of the above.

Those carbon nanotubes are conventionally synthesized by a known method, such as arc discharge, laser ablation, and CVD, and the present invention can employ any of the methods. However, arc discharge in a magnetic field is preferable from the viewpoint of synthesizing a highly pure carbon nanotube.

Carbon nanotubes used in the present invention are preferably equal to and more than 0.3 nm and equal to or less than 100 nm in diameter. If the diameter of the carbon nanotubes exceeds this upper limit, the synthesis becomes difficult and costly. A more desirable upper limit of the diameter of the carbon nanotubes is 30 nm or less.

In general, the lower limit of the carbon nanotube diameter is about 0.3 nm from a structural standpoint. However, too thin a diameter could lower the synthesis yield. It is therefore preferable to set the lower limit of the carbon nanotube diameter to 1 nm or more, more preferably 10 nm or more.

The length of carbon nanotubes used in the present invention is preferably equal to or more than 0.1 $\mu$m and equal to or less than 100 $\mu$m. If the length of the carbon nanotubes exceeds this upper limit, the synthesis becomes difficult or requires a special method raising cost, which is not preferable. On the other hand, if the length of the carbon nanotubes falls short of this lower limit, the number of cross-link bonding points per carbon nanotube is reduced, which is not preferable. A more preferable upper limit of the carbon nanotube length is 10 $\mu$m or less and a more preferable lower limit of the carbon nanotube length is 1 $\mu$m or more.

The appropriate carbon nanotube content in the cross-linking application liquid varies depending on the length and thickness of carbon nanotubes, whether single-wall carbon nanotubes or multi-wall carbon nanotubes are used, the type and amount of functional groups in the carbon nanotubes, the type and amount of cross-linking agents or an additive for bonding functional groups together, the presence or absence of a solvent or other additive used and, if one is used, the type and amount of the solvent or additive, etc. The carbon nanotube content in the solution should be high enough to form an excellent coat after curing but not excessively high because the ease of coating decreases.

Specifically, the ratio of carbon nanotubes to the entire application liquid excluding the mass of the functional groups is 0.01 to 10 g/l, preferably 0.1 to 5 g/l, and more preferably 0.5 to 1.5 g/l, although, as mentioned above, the ranges could be different if the parameters are different.

If the purity of carbon nanotubes to be used is not high enough, it is desirable to raise the purity by refining the carbon nanotubes prior to preparation of the cross-linking application liquid. In the present invention, the higher the carbon nanotube purity, the better the result can be. Specifically, the purity is preferably 90% or higher, more desirably, 95% or higher. When the purity is low, cross-linking agents are cross-linked to carbon products such as amorphous carbon and tar, which are impurities. This could change the cross-linking distance between carbon nanotubes, leading to a failure in obtaining desired characteristics. No particular limitation is put on how carbon nanotubes are refined, and any known refining method can be employed.

(Functional Group 1)

In the first method in which the cross-linked site is formed using a cross-linking agent, carbon nanotubes can have any functional group to be connected thereto, as long as functional groups selected can be added to the carbon nanotubes chemically and can prompt a cross-linking reaction with any type of cross-linking agent. Specific examples of such functional groups include —COOR, —COX, —MgX, —X (where X represents halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (where R, R$^1$, R$^2$, and R' each represent a substituted or unsubstituted hydrocarbon group). Note that employable functional groups are not limited to those examples.

Of those, a selection of at least one functional group from the group consisting of —OH, —COOH, —COOR (where R represents a substituted or unsubstituted hydrocarbon group), —COX (where X represents is a halogen atom), —NH$_2$, and —NCO is preferable. In that case, a cross-linking agent, which can prompt a cross-linking reaction with the selected functional group, is selected as the cross-linking agent.

In particular, —COOR (where R represents a substituted or unsubstituted hydrocarbon group) is particularly preferable. This is because a carboxyl group can be relatively easily introduced into a carbon nanotube, because the resultant substance (a carbon nanotube carboxylic acid) can be easily introduced as a functional group by esterifying the substance, and because the substance has good reactivity with a cross-linking agent.

R in the functional group —COOR is a substituted or unsubstituted hydrocarbon group, and is not particularly limited. However, R is preferably an alkyl group having 1 to 10 carbon atoms, more preferably an alkyl group having 1 to 5 carbon atoms, and particularly preferably a methyl group or an ethyl group in terms of reactivity, solubility, viscosity, and ease of use as a solvent of a paint.

The appropriate amount of functional groups introduced varies depending on the length and thickness of carbon nanotubes, whether single-wall carbon nanotubes or multi-wall carbon nanotubes are used, the types of functional groups, the use of the capacitor, etc. From the viewpoint of the strength of the cross-linked substance obtained, namely, the strength of the coat, a preferable amount of functional groups introduced is large enough to add two or more functional groups to each carbon nanotube. How functional groups are introduced into carbon nanotubes will be explained in the section below titled [Method of Manufacturing a Capacitor].

(Cross-linking Agent)

Any cross-linking agent, which is an essential ingredient of the cross-linking application liquid, can be used as long as the cross-linking agent is capable of prompting a cross-linking reaction with the functional groups of the carbon nanotubes. In other words, the types of cross-linking agents that can be selected are limited to a certain degree by the types of the functional groups. Also, the conditions of curing (heating, UV irradiation, irradiation of visible light, natural curing, etc.) as a result of the cross-linking reaction are naturally determined by the combination of those parameters.

Specific examples of the preferable cross-linking agents include a polyol, a polyamine, a polycarboxylic acid, a polycarboxylate, a polycarboxylic acid halide, a polycarbodiimide, and a polyisocyanate. It is desirable to select at least one cross-lining agent from the group consisting of the above. In that case, a functional group which can prompt a reaction with the cross-linking agent is selected as the functional group.

At least one functional group and one cross-linking agent are particularly preferably selected respectively from the group exemplified as the preferable functional group and the group exemplified as the preferable cross-linking agent, so that a combination of the functional group and the cross-linking agent may prompt a cross-linking reaction with each other. The following Table 1 lists the combinations of the functional group of the carbon nanotubes and the corresponding cross-linking agent, which can prompt a cross-linking reaction, along with curing conditions of the combinations.

TABLE 1

| Functional group of carbon nanotube | Cross-linking agent | Curing condition |
|---|---|---|
| —COOR | Polyol | heat curing |
| —COX | Polyol | heat curing |
| —COOH | Polyamine | heat curing |
| —COX | Polyamine | heat curing |
| —OH | Polycarboxylate | heat curing |
| —OH | Polycarboxylic acid halide | heat curing |
| —NH$_2$ | Polycarboxylic acid | heat curing |
| —NH$_2$ | Polycarboxylic acid halide | heat curing |
| —COOH | Polycarbodiimide | heat curing |
| —OH | Polycarbodiimide | heat curing |
| —NH$_2$ | Polycarbodiimide | heat curing |
| —NCO | Polyol | heat curing |
| —OH | Polyisocyanate | heat curing |
| —COOH | Ammonium complex | heat curing |
| —COOH | cis-platin | heat curing |

*where R represents a substituted or unsubstituted hydrocarbon group
*where X represents a halogen Of those combinations, preferable is the combination of —COOR (where R represents a substituted or unsubstituted hydrocarbon group) with good reactivity on a functional group side and a polyol, a polyamine, an ammonium complex, congo red, and cis-platin, which form a robust cross-linked substance with ease. The terms "polyol", "polyamine", and "ammonium complex", in the present invention are genetic names for organic compounds each having two or more OH groups, NH$_2$ groups, and ammonium groups, respectively. Of those, one having 2 to 10 (more preferably 2 to 5) carbon atoms and 2 to 22 (more preferably 2 to 5) OH groups is preferable in terms of cross-linkability, solvent compatibiity when an excessive amount thereof is charged, processability of waste liquid after a reaction by virtue of biodegradability (environment aptitude), yield of polyol synthesis, and so on. In particular, the number of carbon atoms is preferably lower within the above range because a gap between carbon nanotubes in the resultant coat can be narrowed to bring the carbon nanotubes into substantial contact with each other (to bring the carbon nanotubes close to each other). Specifically, glycerin and ethylene glycol are particularly preferable, and it is preferable to use one or both of glycerin and ethylene glycol as a cross-linking agent.

From another perspective, the cross-linking agent is preferably a not-self-polymerizable cross-linking agent. In addition to glycerin and ethylene glycol as examples of the polyols, butenediol, hexynediol, hydroquinone, and naphthalenediol are not-self-polymerizable cross-linking agents. More generally, a prerequisite of the not-self-polymerizable cross-linking agent is to be without a pair of functional groups, which can prompt a polymerization reaction with each other, in itself. On the other hand, examples of a self-polymerizable cross-linking agent include one that has a pair of functional groups, which can prompt a polymerization reaction with each other (alkoxide, for example).

(Functional Group 2)

Further, in the second method of obtaining a network structure of mutually cross-linked carbon nanotubes, a cross-linked site of the carbon nanotube structure is formed by chemically bonding plural functional groups, in which at least one end of the cross-linked site is bonded to different carbon nanotubes respectively. In the second method, a functional group to be bonded to the carbon nanotubes is not particularly limited as long as the functional group can be chemically added to the carbon nanotubes and is capable of reacting to each other with any type of additive, and any functional group can be selected. Specific examples of the functional group include —COOR, —COX, —MgX—, —X (where X represents a halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (where R, R$^1$, R$^2$, and R$^3$ each represent a substituted or unsubstituted hydrocarbon group), but are not limited to those.

Of those, the preferable functional group includes: at least one functional group selected from the group consisting of —COOR (where R represents a substituted or unsubstituted hydrocarbon group), —COOH, —COX (where X represents a halogen atom), —OH, —CHO—, and —NH$_2$ for the condensation reaction; at least one functional group selected from the group consisting of —NH$_2$, —X (where X represents a halogen atom), —SH, —OH, —OSO$_2$CH$_3$, and —OSO$_2$(C$_6$H$_4$)CH$_3$ for the substitution reaction; at least one functional group selected from the group consisting of —OH and —NCO for the addition reaction; and —SH for the oxidative reaction.

Further, it is also possible to bond a molecule, which partially contains those functional groups, with the carbon nanotubes to be chemically bonded at a preferable functional group portion exemplified above. Even in this case, a functional group with a large molecular weight to be bonded to the carbon nanotubes is bonded as intended, enabling control of a length of the cross-linked site.

(Additive)

Any additive that is capable of making the functional groups of the carbon nanotubes react to each other can be mixed in the cross-linking application liquid. In other words, the types of additives that can be selected are limited to a certain degree by the types of the functional groups and the reaction type. Also, the condition of curing (heating, UV irradiation, irradiation of visible light, natural curing, etc.) as a result of the reaction is naturally determined by the combination of those parameters.

(Condensation Agent)

To give specific examples of preferable additives, an acid catalyst or a dehydration condensation agent, for example, sulfuric acid, N-ethyl-N'-(3-dimethylaminopropyl) carbodiimide, and dicyclohexyl carbodiimide, is preferred as a condensation agent. Preferably, at least one condensation agent is selected from the group consisting of the above. The functional groups selected have to react to each other with the help of the selected condensation agent.

(Base)

When a substitution reaction is to be utilized, a base is an essential ingredient of the cross-linking application liquid. An arbitrary base is selected in accordance with the degree of acidity of hydroxyl groups.

Preferably, the base is at least one selected from the group consisting of sodium hydroxide, potassium hydroxide, pyridine, and sodium ethoxide. In that case, a substitution reaction is to take place among the functional groups with the help of the selected base.

It is particularly preferable to select a combination of functional groups such that at least two functional groups from each of the example groups that are given above as examples of preferable functional groups react to each other. Table 2 below lists functional groups of carbon nanotubes and names of the corresponding reactions.

An addition reaction does not necessarily need an additive. In an oxidative reaction, an additive is not necessarily needed but adding an oxidative reaction accelerator is preferable. A specific example of the accelerator is iodine.

TABLE 2

| Bonding site | Functional group of carbon nanotube (A) | Functional group of carbon nanotube (B) | Reaction |
|---|---|---|---|
| —COOCO— | —COOH | — | Dehydration condensation |
| —S—S— | —SH | — | Oxidative reaction |
| —O— | —OH | — | Dehydration condensation |
| —NH—CO— | —COOH | —NH$_2$ | Dehydration condensation |
| —COO— | —COOH | —OH | Dehydration condensation |
| —COO— | —COOR | —OH | Dehydration condensation |
| —COO— | —COX | —OH | Dehydration condensation |
| —CH=N— | —CHO | —NH$_2$ | Dehydration condensation |
| —NH— | —NH$_2$ | —X | Substitution reaction |
| —S— | —SH | —X | Substitution reaction |
| —O— | —OH | —X | Substitution reaction |
| —O— | —OH | —OSO$_2$CH$_3$ | Substitution reaction |
| —O— | —OH | —OSO$_2$(C$_6$H$_4$)CH$_3$ | Substitution reaction |
| —NH—COO— | —OH | —N=C=O | Addition reaction |

*where R represents a substituted or unsubstituted hydrocarbon group
*where X represents a halogen Next, the content of a cross-linking agent or of an additive for bonding a functional group in the cross-linking application liquid varies depending on the type of the cross-linking agent (including whether the cross-linking agent is self-polymerizable or not self-polymerizable) and the type of the additive for bonding a functional group. The content also varies depending on the length and thickness of a carbon nanotube, whether the carbon nanotube is of a single-wall type or a multi-wall type, the type and amount of a functional group of the carbon nanotube, the presence or absence, types, and amounts of a solvent and other additives, and the like. Therefore, the content can not be determined uniquely. In particular, for example, glycerin or ethylene glycol can also provide characteristics of a solvent because a viscosity of glycerin or ethylene glycol is not so high, and thus an excessive amount of glycerin or ethylene glycol can be added.

(Other Additive)

The cross-linking application liquid may contain various additives including a solvent, a viscosity modifier, a dispersant, and a cross-linking accelerator. A solvent is added when satisfactory application of the cross-linking application liquid is not achieved with solely the cross-linking agents or the additive for bonding the functional groups. A solvent that can be employed is not particularly limited, and may be appropriately selected according to the types of the cross-linking agents. Specific examples of employable solvents include: organic solvents such as methanol, ethanol, isopropanol, n-propanol, butanol, methyl ethyl ketone, toluene, benzene, acetone, chloroform, methylene chloride, acetonitrile, diethyl ether, and tetrahydrofuran (THF); water; aqueous solutions of acids; and alkaline aqueous solutions. A solvent as such is added in an amount that is not particularly limited but determined appropriately by taking into consideration the ease of coating the cross-linking application liquid.

A viscosity modifier is added when satisfactory application of the cross-linking application liquid is not achieved with solely the cross-linking agents and the additive for bonding the functional groups. A solvent that can be employed is not particularly limited, and may be appropriately selected according to the kinds of cross-linking agents and additives for bonding the functional groups used. Specific examples of employable viscosity modifiers include methanol, ethanol, isopropanol, n-propanol, butanol, methyl ethyl ketone, toluene, benzene, acetone, chloroform, methylene chloride, acetonitrile, diethyl ether, and THF.

Some of those viscosity modifiers have the function of a solvent when added in a certain amount, and it is meaningless to apparently discriminate viscosity modifiers from solvents. A viscosity modifier as such is added in an amount that is not particularly limited but determined by taking into consideration the ease of coating the cross-linking application liquid.

A dispersant is added to the cross-linking application liquid in order to maintain the dispersion stability of the carbon nanotubes, the cross-linking agents, or the additive for bonding the functional groups in the application liquid. Various known surface-active agents, water-soluble organic solvents, water, aqueous solutions of acids, alkaline aqueous solutions, etc. can be employed as a dispersant. However, a dispersant is not always necessary since components of the coating material of the present invention have high dispersion stability by themselves. In addition, depending on the use of the structure after the formation, the presence of a dispersant and like other impurities in the coat may not be desirable. In such case, a dispersant is not added at all, or is added in a very small amount.

(Method of Preparing the Cross-linking Application Liquid)

A method of preparing a cross-linking application liquid is described next.

The cross-linking application liquid is prepared by mixing, as needed, carbon nanotubes that have functional groups with a cross-linking agent that prompts a cross-linking reaction with the functional groups or an additive that causes the functional groups to form chemical bonding among themselves (mixing step). The mixing step may be preceded by an addition step in which the functional groups are introduced into the carbon nanotubes.

If carbon nanotubes having functional groups are starting materials, the preparation starts with the mixing step. If normal carbon nanotubes themselves are starting materials, the preparation starts with the addition step. The addition step is a step of introducing desired functional groups into carbon nanotubes. How functional groups are introduced varies depending on the type of functional group. One method is to add a desired functional group directly, and another method is to introduce a functional group that is easy to attach and then substitute the whole functional group or a part thereof or attach a different functional group to the former functional group in order to obtain the objective functional group. Still another method is to apply a mechanochemical force to a carbon nanotube to break or modify only a small portion of a graphene sheet on the surface of the carbon nanotube and introduce various functional groups from the broken or modified portion.

Cup-stacked carbon nanotubes, which have many defects on the surface upon manufacture, and carbon nanotubes that are formed by vapor phase growth are relatively easy to introduce functional groups. On the other hand, carbon nanotubes each having a perfect graphene sheet structure exert the carbon nanotube characteristics more effectively and are easier to control the characteristics. Consequently, it is particularly preferable to use a multi-wall carbon nanotube so that defects are formed on its outermost layer so that the outermost layer has appropriate electric conductivity as an electrode of a capacitor to bond functional groups for cross-linking while the inner layers having less structural defects exert the carbon nanotube characteristics.

There is no particular limitation put on the addition step and any known method can be employed. Various addition methods disclosed in JP 2002-503204 A may be employed in the present invention depending on the purpose. A description is given on a method of introducing —COOR (where R represents a substituted or unsubstituted hydrocarbon group), a particularly desirable functional group among the functional groups listed in the above. To introduce —COOR (where R represents a substituted or unsubstituted hydrocarbon group) into carbon nanotubes, carboxyl groups may be (1) added to the carbon nanotubes once, and then (2) esterified.

(1) Addition of Carboxyl Group

To introduce carboxyl groups into carbon nanotubes, carboxyl groups are refluxed together with an acid having an oxidizing effect. This operation is relatively easy and is preferable since carboxyl groups with high reactivity are attached to carbon nanotubes. A brief description of the operation is given below.

An acid having an oxidizing effect is, for example, concentrated nitric acid, hydrogen peroxide water, a mixture of sulfuric acid and nitric acid, or aqua regia. When concentrated nitric acid is used, in particular, the concentration is preferably 5 mass % or higher, more preferably, 60 mass % or higher.

A normal reflux method can be employed. The temperature at which reflux is performed is preferably set to a level near the boiling point of the acid used. When concentrated nitric acid is used, for instance, the temperature is preferably set to 120 to 130° C. The reflux preferably lasts 30 minutes to 20 hours, more preferably, 1 hour to 8 hours.

Carbon nanotubes to which carboxyl groups are attached (a carbon nanotube carboxylic acid) are generated in the reaction liquid after the reflux. The reaction liquid is cooled down to room temperature and then receives a separation operation or washing as necessary, thereby obtaining the objective carbon nanotube carboxylic acid.

(2) Esterification

The target functional group —COOR (where R represents a substituted or unsubstituted hydrocarbon group) can be introduced by adding an alcohol to the obtained carbon nanotube carboxylic acid and dehydrating the mixture for esterification.

The alcohol used for the esterification is determined according to R in the formula of the functional group. That is, if R is $CH_3$, the alcohol is methanol, and if R is $C_2H_5$, the alcohol is ethanol. A catalyst is generally used in the esterification, and a conventionally known catalyst such as sulfuric acid, hydrochloric acid, or toluenesulfonic acid can also be used in the present invention. The use of sulfuric acid as a catalyst is preferable from a view of not prompting a side reaction in the present invention.

The esterification may be conducted by adding an alcohol and a catalyst to a carbon nanotube carboxylic acid and refluxing the mixture at an appropriate temperature for an appropriate time period. A temperature condition and a time period condition in this case depend on type of a catalyst, type of alcohol, or the like and cannot be simply determined, but a reflux temperature close to the boiling point of the alcohol used is preferable. The reflux temperature is preferably in the range of 60 to 70° C. for methanol, for example. Further, a reflux time period is preferably in the range of 1 to 20 hours, more preferably in the range of 4 to 6 hours.

A carbon nanotube with the functional group —COOR (where R represents a substituted or unsubstituted hydrocarbon group) added can be obtained by separating a reaction product from a reaction solution after esterification and washing the reaction product as required.

The mixing step is a step of mixing, as required, carbon nanotubes which contain functional groups with a cross-linking agent prompting a cross-linking reaction with the functional groups or an additive for bonding the functional groups to prepare the cross-linking application liquid. In the mixing step, other components described in the aforementioned section titled [Capacitor] are mixed, in addition to the carbon nanotubes containing functional groups and the cross-linking agents. Then, preferably, an amount of a solvent or a viscosity modifier is adjusted considering ease of coating to prepare the cross-linking application liquid just before application.

Simple stirring with a spatula and stirring with a stirrer of a stirring blade type, a magnetic stirrer, and a stirring pump may be used. However, to achieve higher degree of uniformity in dispersion of the carbon nanotubes to enhance storage stability while fully extending a network structure by cross-linking of the carbon nanotubes, an ultrasonic disperser or a homogenizer may be used for powerful dispersion. However, when using a stirring device with a strong shear force of stirring such as a homogenizer, there arises a risk of cutting and damaging the carbon nanotubes in the solution, thus the device may be used for a very short time period.

A coating film of a carbon nanotube structure is formed by coating a substrate surface with the cross-linking application liquid described above and curing the substrate. A coating method and a curing method are described in detail in the section below titled [Method of Manufacturing a Capacitor].

The carbon nanotube structure in the present invention is in a state where carbon nanotubes are networked. In detail, the carbon nanotube structure is cured into a matrix shape, carbon nanotubes are connected to each other via cross-linked sites, and characteristics of a carbon nanotube itself such as high electron- and hole-transmission characteristics can be exerted sufficiently. In other words, the carbon nanotube structure has carbon nanotubes that are tightly connected to each other, contains no other binders and the like, and is thus composed substantially only of carbon nanotubes, so that characteristics peculiar to a carbon nanotube are fully utilized.

A thickness of the carbon nanotube structure in the present invention when the structure is shaped into a layer can be widely selected from being very thin to being thick according to an application. Lowering a content of the carbon nanotubes in the cross-linking application liquid used (simply, lowering the viscosity by diluting) and coating the cross-linking application liquid in a thin coat form allows a very thin coat to be obtained. Similarly, raising a content of the carbon nanotubes allows a thick structure to be obtained. Further, repeating the application allows an even thicker structure to be obtained. Formation of a very thin coat from a thickness of about 10 nm is possible, and formation of a thick coat without an upper limit is possible through recoating. A possible coat thickness with one coating is about 5 μm. Further, a desired shape of the structure can be obtained by injecting the cross-linking application liquid, in which a content or the like is adjusted, to a mold and bonding.

In the carbon nanotube structure, when using the cross-linking agent of the first method, a site where the carbon nanotubes cross-link together, that is, the cross-linked site formed by a cross-linking reaction between the functional groups of the carbon nanotubes and the cross-linking agents has a cross-linking structure. In the cross-linking structure, residues of the functional group remaining after a cross-linking reaction are connected together with a connecting group, which is a residue of the cross-linking agent remaining after a cross-linking reaction.

As described, the cross-linking agent, which is a component of the cross-linking application liquid, is preferably not self-polymerizable. If the cross-linking agent is not self-polymerizable, the carbon nanotube structure layer finally manufactured would be constructed from a residue of only one cross-linking agent. The gap between the carbon nanotubes to be cross-linked can be controlled to a size of a residue of the cross-linking agent used, thereby providing a desired network structure of the carbon nanotubes with high duplicability. Further, plural cross-linking agents are not present between the carbon nanotubes, thus enabling an enhancement of a substantial density of the carbon nanotubes in the carbon nanotube structure. Further, reducing a size of a residue of the cross-linking agent can extremely narrow a gap between each of the carbon nanotubes both electrically and physically (carbon nanotubes are substantially in direct contact with each other).

When forming the carbon nanotube structure with a cross-linking application liquid prepared by selecting a single functional group of the carbon nanotubes and a single not-self-polymerizable cross-linking agent, the cross-linked site of the layer will have the same cross-linking structure (Example 1). Further, even when forming the carbon nanotube structure layer with a cross-linking application liquid prepared by selecting plural types of functional groups of the carbon nanotubes and/or plural types of not-self-polymerizable cross-linking agents, the cross-linked site of the layer will mainly have a cross-linking structure based on a combination of the functional group and the not-self-polymerizable cross-linking agent mainly used (Example 2).

On the contrary, when forming the carbon nanotube structure layer with a cross-linking application liquid prepared by selecting self-polymerizable cross-linking agents, without regard to whether the functional groups and the cross-linking agents are of single or plural types, the cross-linked site of the layer where carbon nanotubes cross-link together will not mainly have a specific cross-linking structure. This is because the cross-linked site will be in a state where numerous connecting groups with different connecting (polymerization) numbers of the cross-linking agents coexist.

In other words, by selecting not-self-polymerizable cross-linking agents, the cross-linked sites, where the carbon nanotubes of the carbon nanotube structure layer cross-link together, bond with the functional group through a residue of only one cross-linking agent, thus forming a mainly identical cross-linking structure. "Mainly identical" here is a concept including a case with all of the cross-linked sites having an identical cross-linking structure as described above (Example 1), as well as a case with the cross-linking structure based on a combination of the functional group and the not-self-polymerizable cross-linking agent mainly used becomes a main structure with respect to the whole cross-linked site as described above (Example 2).

When referring as "mainly identical", a "ratio of identical cross-linked sites" with respect to the whole cross-linked sites will not have a uniform lower limit defined. The reason is that a case of imparting a functional group or a cross-linking structure with an aim different from formation of a carbon nanotube network may be assumed for example. However, in order to actualize high electrical or physical characteristics peculiar to carbon nanotubes with a strong network, a "ratio of identical cross-linked sites" with respect to the total cross-linked sites is preferably 50% or more, more preferably 70% or more, further more preferably 90% or more, and most preferably 100%, based on numbers. Those number ratios can be determined through, for example, a method of measuring an intensity ratio of an absorption spectrum corresponding to the cross-linking structure with an infrared spectrum.

As described, if a carbon nanotube structure layer has the cross-linked site with a mainly identical cross-linking structure where carbon nanotubes cross-link, a uniform network of the carbon nanotubes can be formed in a desired state. In addition, the carbon nanotube network can be constructed with homogeneous, satisfactory, and expected electrical or physical characteristics and high duplicability.

Further, the connecting group preferably contains hydrocarbon for a skeleton thereof. "Hydrocarbon for a skeleton" here refers to a main chain portion of the connecting group consisting of hydrocarbon, the main portion of the connecting group contributing to connecting residues together of the functional groups of carbon nanotubes to be cross-linked remaining after a cross-linking reaction. A side chain portion, where hydrogen of the main chain portion is substituted by another substituent, is not considered. Obviously, it is more preferable that the whole connecting group consists of hydrocarbon.

The number of carbon atoms in the hydrocarbon is preferably 2 to 10, more preferably 2 to 5, and further more preferably 2 to 3. The connecting group is not particularly limited as long as the connecting group is divalent or more.

In the cross-linking reaction of the functional group —COOR (where R represents a substituted or unsubstituted hydrocarbon) and ethylene glycol, exemplified as a preferable combination of the functional group of carbon nanotubes and the cross-linking agent, the cross-linked site, where plural carbon nanotubes cross-link to each other, becomes —COO(CH$_2$)$_2$OCO—.

Further, in the cross-linking reaction of the functional group —COOR (where R represents a substituted or unsubstituted hydrocarbon) and glycerin, the cross-linked site, where plural carbon nanotubes cross-link to each other, becomes —COOCH$_2$CHOHCH$_2$OCO— or —COOCH$_2$CH(OCO—)CH$_2$OH if two OH groups contribute in the cross-link, and the cross-linked site becomes —COOCH$_2$CH(OCO—)CH$_2$OCO— if three OH groups contribute in the cross-link.

As has been described, the carbon nanotube structure has a network structure that is composed of plural carbon nanotubes connected to each other through plural cross-linked sites. Thus, contact or arrangement of carbon nanotubes is not disturbed, unlike a mere carbon nanotube dispersion film. Therefore, there are stably obtained characteristics that are unique of carbon nanotubes, including: electrical characteristics such as high electron- and hole-transmission characteristics; physical characteristics such as thermal conductivity and toughness; and light absorption characteristics.

Further, in the second method of forming the cross-linked site through chemically bonding plural functional groups, in which at least one end is bonded to different carbon nanotubes respectively, the carbon nanotube structure has carbon nanotubes connected in a matrix form through a cross-linked portion. Therefore, characteristics of carbon nanotubes, such as high electron- and hole-transmission characteristics, are easily obtained. That is, the carbon nanotube structure has carbon nanotubes that are tightly connected together, and contains no other binders. Therefore, the carbon nanotube structure can be composed substantially only of carbon nanotubes.

Further, the cross-linked sites are formed by a reaction among the functional groups, thus enabling an enhancement of the actual carbon nanotube density of the carbon nanotube structure. If the functional groups are reduced in size, the carbon nanotubes can be brought very close to each other both electrically and physically, and characteristics of a carbon nanotube itself can be more easily obtained.

Further, cross-linked sites are chemical bonding of the functional groups, thus the carbon nanotube structures mainly have the same cross-linking structure. Therefore, a uniform network of carbon nanotubes can be formed into a desired state. Therefore, electrical and physical carbon nanotube characteristics that are homogeneous and excellent can be obtained. Furthermore, electrical or physical characteristics expected from carbon nanotubes, or close to the expected level or with high duplicability, can be obtained.

A layer except the carbon nanotube structure layer may be formed in the capacitor of the present invention. For example, placing an adhesive layer between the surface of the substrate and the carbon nanotube structure layer for enhancing adhesiveness therebetween can improve the adhesive strength of a patterned carbon nanotube structure layer, and is thus preferable. In addition, the periphery of the carbon nanotube structure can be coated with an insulator, an electric conductor, or the like according to capacitor applications.

As has been described, the base body may be a flexible or pliable substrate. Employing a flexible or pliable substrate as the base body improves the overall flexibility of the capacitor and makes it possible to use the capacitor in a much wider range of environment (where to install and the like).

If the capacitor having a flexible or pliable substrate is used to build an apparatus, the capacitor can function as a conducting wire while conforming to various configurations and shapes in the apparatus.

Specifics of the above-described capacitor of the present invention including its shape will be made clear in the following section of [Method of Manufacturing a Capacitor] and Example. Note that the descriptions below show merely examples and are not to limit specific modes of the carbon nanotube composite structure of the present invention.

[Method of Manufacturing a Capacitor]

A method of manufacturing a capacitor of the present invention is a method suitable for manufacture of the above-described capacitor of the present invention. Specifically, the method of manufacturing a capacitor of the present invention includes as steps of forming a carbon nanotube structure that forms one of a pair of opposing electrodes of the capacitor: (A) a coating step for coating a surface of a substrate a solution that contains plural carbon nanotubes having functional groups connected thereto; and (B) a cross-linking step for forming a carbon nanotube structure layer that has a network structure composed of the plural carbon nanotubes that are cross-linked to each other by chemical bonding formed among the functional groups.

Hereinafter, an example of a method of manufacturing a capacitor according to the present invention will be described for each step with reference to FIG. 2. Although a lower electrode is formed from a coating film of a carbon nanotube structure in the description here, the same process can be employed for when an upper electrode instead of the lower electrode is formed from a coating film of a carbon nanotube structure. The description here centers on the electrode that is formed from a coating film of a carbon nanotube structure in accordance with the present invention whereas formation of a ferroelectric film and the like is described briefly, since the structure of a multilayer capacitor and how the multilayer capacitor is manufactured are well known and components other than the electrode can be formed by known methods.

(A) Coating Step for Coating

In the present invention, the "a coating step for coating" is a step of coating to the surface of the substrate 2 a solution containing a carbon nanotube having a functional group (cross-linking application liquid 11).

The coating method is not particularly limited, and any method can be adopted from a wide range to coat the cross-linking application liquid. For example the liquid may be simply dropped or spread with a squeegee or may be applied by a common application method. Examples of common application methods include spin coating, bar coating, cast coating, roll coating, brush coating, dip coating, spray coating, and curtain coating.

(B) Cross-linking Step

In the present invention, the "cross-linking step" is a step of a carbon nanotube structure 1 that has a network structure composed of the plural carbon nanotubes cross-linked with each other through curing of the cross-linking application liquid 11 after the application.

An operation carried out in the cross-linking step is naturally determined according to the combination of the functional groups with the cross-linking agent or the additives for chemically bonding the functional groups together. If a combination of thermally curable functional groups is employed, the applied solution is heated by various heaters or the like. If a combination of functional groups that are cured by ultraviolet rays is employed, the applied solution is irradiated with a UV lamp or left under the sun. If a combination of self-curable functional groups is employed, it is sufficient to let the applied solution stand still. Leaving the applied solution to stand still is deemed as one of the operations that may be carried out in the cross-linking step of the present invention.

Heat curing (polyesterification through an ester exchange reaction) is conducted for the case of a combination of a carbon nanotube, to which the functional group —COOR (where R represents a substituted or unsubstituted hydrocarbon group) is added, and a polyol (among them, glycerin and/or ethylene glycol). Heating causes an ester exchange reaction between —COOR of the esterified carbon nanotube carboxylic acid and R'—OH (where R' represents a substituted or unsubstituted hydrocarbon group) of a polyol. As the reaction progresses multilaterally, the carbon nanotubes are cross-linked until a network of carbon nanotubes connected to each other constructs a carbon nanotube structure layer 14.

To give an example of conditions preferable for the above combination, the heating temperature is specifically set to preferably 50 to 500° C., more preferably 150 to 200° C., and the heating period is specifically set to preferably 1 minute to 10 hours, more preferably 1 hour to 2 hours.

(C) Patterning Step

In the present invention, the "patterning step" is for patterning the carbon nanotube structure layer into a desired shape. FIG. 2(*e*) is a schematic sectional view showing the surface state of the base body after (C) Patterning Step. Although no particular limitations are put on operations of the patterning step, there are two preferred modes of (C-A) and (C-B) to the patterning step.

(C-A)

In Mode (C-A), dry etching is performed on other regions of the carbon nanotube structure layer on the base body surface than the region to be patterned into a desired shape, thus removing the carbon nanotube structure layer from those regions and patterning the carbon nanotube structure layer into a pattern of the desired shape.

Patterning the carbon nanotube structure layer into a desired shape by dry etching means that other regions of the carbon nanotube structure layer on the base body surface than the region to form the desired shape receive irradiation of radicals or the like. Methods of irradiation of radicals or the like include one in which the other regions of the carbon nanotube structure layer than the region to form the pattern is directly irradiated with radicals or the like (C-A-1), and one in which the other regions than the region to form the pattern are covered with a resist layer and then the entire base body surface (on the side where the carbon nanotube structure layer and the resist layer are formed) is irradiated with radicals or the like (C-A-2).

(C-A-1)

Direct irradiation of the other regions of the carbon nanotube structure layer than the region to form the pattern with radicals or the like specifically means that regions of the carbon nanotube structure layer on the base body surface other than the region to be patterned into a desired shape are irradiated with ion beams of gas molecule ions, thereby removing the carbon nanotube structure layer from the irradiated regions and patterning the carbon nanotube structure layer into the desired shape.

In the form of an ion beam, ions of gas molecules can be radiated selectively with precision on the order of several nm. This method is preferable in that the carbon nanotube structure layer can be patterned into a desired shape in one operation.

Examples of gas species that can be chosen for the ion beam method include oxygen, argon, nitrogen, carbon dioxide, and hexafluoride. Oxygen is particularly desirable in the present invention. In the ion beam method, a voltage is applied to gas molecules in vacuum to accelerate and ionize the gas molecules and the obtained ions are radiated in the form of a beam. The ion beam method is capable of etching various substances with varying irradiation accuracy by changing the type of gas used.

(C-A-2)

To employ Mode (C-A-2) in which the other regions than the region to form the pattern are covered with a resist layer before the entire base body surface is irradiated with radicals or the like, Patterning Step includes: Resist Layer Forming Step (C-A-2-1) for forming a resist layer on the region of the carbon nanotube structure layer on the base body surface that is to be patterned into a desired shape; and Removal Step (C-A-2-2) for performing dry etching on the side of the base body where the carbon nanotube structure layer and the resist layer are layered, thereby removing the carbon nanotube structure layer from the exposed regions of that are not covered with the resist layer. Removal Step in Mode (C-A-2) may be followed by Resist Layer Peeling Step (C-A-2-3) in which the resist layer formed in Resist Layer Forming Step is peeled off.

(C-A-2-1) Resist Layer Forming Step

In Resist Layer Forming Step, a resist layer is formed on the region of the carbon nanotube structure layer on the base body surface that is to be patterned into a desired shape. This step follows a process generally called a photolithography process and, instead of directly forming a resist layer on the region of the carbon nanotube structure layer that is to be patterned into a desired shape, a resist layer 16 is once formed on the entire surface of a base body 12 on the side where a carbon nanotube structure layer 14 is formed as shown in FIG. 2(*b*). Then the region to form the pattern of desired shape is exposed to light and portions that are not exposed to light are removed through subsequent development. Ultimately, the resist layer is present only on the region of the carbon nanotube structure layer that is to form a desired pattern.

FIG. 2(*c*) is a schematic sectional view showing the surface state of the base body after Resist Layer Forming Step (C-A-2-1). Depending on the type of resist, a portion that is exposed to light is removed by development whereas a portion that is not exposed to light remains. A known method can be employed to form the resist layer. Specifically, the resist layer is formed by coating a resist agent to the substrate with a spin coater or the like and then heating the applied agent.

There is no particular limitation on the material (resist agent) used to form the resist layer 16, and various known resist materials can be employed without any modification. Employing resin (forming a resin layer as the resist layer 16) is particularly desirable. The carbon nanotube structure layer 14 has a mesh-like network of carbon nanotubes and is a porous structure. Accordingly, if the resist layer 16 is formed from a metal evaporation film or like other material that forms a film on the very surface and does not infiltrate deep into the holes of the mesh, carbon nanotubes cannot be sealed satisfactorily against radiation of plasma or the like (insufficient sealing means exposure to plasma or the like). As a result, plasma or the like enters from the holes and corrodes the carbon nanotube layer 14 under the resist layer 16, reducing the contour of the carbon nanotube structure layer 14 and leaving only a small portion of the carbon nanotube structure layer 14. Although it is possible to give the resist layer 16 a larger contour (area) than the pattern of desired shape taking into account this reduction in size, this method requires a wide gap between patterns and therefore makes it impossible to form patterns close together.

In contrast, when resin is used to form the resist layer 16, the resin enters the spaces inside the holes and reduces the number of carbon nanotubes that are exposed to plasma or the like. As a result, high density patterning of the carbon nanotube structure layer 14 is made possible.

Examples of the resin material that mainly constitutes the resin layer include, novolac resin, polymethyl methacrylate, and a mixture of the two, but not limited thereto.

The resist material for forming the resist layer is a mixture of one of the above resin materials, or a precursor thereof, and a photosensitive material or the like. The present invention can employ any known resist material. For instance, OFPR 800, a product of TOKYO OHKA KOGYO CO., LTD. and NPR 9710, a product of NAGASE & CO., LTD. can be employed.

Appropriate operations or conditions to expose the resist layer 16 to light (heating if the resist material used is thermally curable, a different exposure method is chosen for a different type of resist material) and to develop are selected in accordance with the resist material used. (Examples of exposure and development operations or conditions include the light source wavelength, the intensity of exposure light, the exposure time, the exposure amount, environmental conditions during exposure, the development method, the type and concentration of developer, the development time, and what pre-treatment or post-treatment is to be employed.) When a commercially available resist material is used, expose and develop following the instruction manual for the product. In general, a UV-curable resist material is chosen for conveniences of handling and exposed to ultraviolet rays drawing the pattern of desired shape. Thereafter, the film is developed using an alkaline developer, which is then washed off with water, and is let dry to complete the photolithography process.

(C-A-2-2) Removal Step

In Removal Step, dry etching is performed on the side of the base body where the carbon nanotube structure layer and the resist layer are layered, thereby removing the carbon nanotube structure layer from the exposed regions of that are not covered with the resist layer. (For the exposed regions, see FIG. 2(*c*). The carbon nanotube structure layer 14 is exposed in regions where the resist layer 16 is removed). FIG. 2(*d*) is a schematic sectional view showing the surface state of the base after (C-A-2-2) Removal Step.

Removal Step can employ every method that is generally called dry etching, including the reactive ion method. The above-described ion beam method in (C-A-1) is one of dry etching methods. See the section (C-A-1) for employable gas species, devices, operation environments, and the like.

In the present invention, oxygen is particularly desirable out of examples of gas species generally usable in dry etching which include oxygen, argon, and fluorine-based gas (e.g., chlorofluoro carbon, $SF_6$, and $CF_4$). With oxygen radicals, carbon nanotubes in the regions of the carbon nanotube structure layer 14 that are to be removed are oxidized (burnt) and turned into carbon dioxide. Accordingly, the residue has little adverse effect, and accurate patterning is achieved.

When oxygen is chosen as gas species, oxygen radicals are generated by irradiating oxygen molecules with ultraviolet rays. A device that generates oxygen radicals by this method is commercially available by the name of UV washer, and is easy to obtain.

(C-A-2-3) Resist Layer Peeling Step

The carbon nanotube structure manufacturing method of the present invention may end with the completion of (C-A-2-2) Removal Step, presenting a mode of the carbon nanotube structure (the mode shown in FIG. 2(*d*)). If the resist layer 16 is to be removed from the carbon nanotube structure of this mode, Removal Step has to be followed by Resist Layer Peeling Step in which the resist layer 16 formed in Resist Layer Forming Step is peeled off. FIG. 2(*e*) is a schematic sectional view showing the surface state of the base body after (C-A-2-3) Resist Layer Peeling Step.

An appropriate resist layer peeling step operation is chosen in accordance with the material used to form the resist layer 16. When a commercially available resist material is used, the resist layer 16 is peeled off following the instruction manual for the product. When the resist layer 16 is a resin layer, a common removal method is to bring the resin layer into contact with an organic solvent that is capable of dissolving the resin layer.

(C-B)

Mode (C-B) Patterning Step includes: Resist Layer Forming Step for forming a resist layer on the region of the carbon nanotube structure layer on the base body surface that is to be patterned into a desired shape; and Removal Step for bringing an etchant into contact with the side of the base body where the carbon nanotube structure layer and the resist layer are layered, thereby removing the carbon nanotube structure layer from the exposed regions of that are not covered with the resist layer. This patterning step mode is a method commonly called wet etching (a method of removing an arbitrary portion using chemical=etchant).

Resist Layer Forming Step in Mode (C-B) is identical with (C-A-2-1) Resist Layer Forming Step described above except that a resist material resistant to etchant should be used in Mode (C-B). Similar to Mode (C-A) Patterning Step, Removal Step in Mode (C-B) Patterning Step may be followed by Resist Layer Peeling Step and details of this peeling step are as described in (C-A-2-3) Resist Layer Peeling Step. Detailed descriptions of these steps are therefore omitted here.

Reference is made to FIG. 2(*c*). In Removal Step in Mode (C-B), an etchant is brought into contact with the side of the base body 12 where the carbon nanotube structure layer 14 and the resist layer 16 are layered, thereby removing the carbon nanotube structure layer 14 from the exposed regions of that are not covered with the resist layer 16. In the present invention, "bringing a contact into contact with" is a concept including all operations for bringing a liquid into contact with a subject, and a liquid may be brought into contact with a subject by any methods such as dipping, spraying, and letting a liquid flow over a subject.

Etchant is in general an acid or alkali. Which etchant to choose is determined by the resist material constituting the resist layer 16, the structure of cross-linking among carbon nanotubes in the carbon nanotube structure layer 14, and other factors. A desirable etchant is one that etches the resist layer 16 as little as possible and that can easily remove the carbon nanotube structure layer 14.

However, an etchant that etches the resist layer 16 may be employed if it is possible to, by appropriately controlling the temperature and concentration of the etchant and how long the etchant is in contact with the carbon nanotube structure layer, remove the exposed regions of the carbon nanotube structure layer 14 before the resist layer 16 is completely etched away.

(D) Ferroelectric Film Forming Step

A ferroelectric film used as the ferroelectric layer of the present invention is formed on the carbon nanotube structure layer. A known method can be chosen arbitrarily to form the ferroelectric thin film; for example, the ferroelectric film may be formed by subjecting a known MOD coat material to screen printing and then baking, or by evaporation, or by the sol-gel method.

(E) Upper Electrode Forming Step

An upper electrode is formed on the ferroelectric film. This step too has options for how to form the upper electrode, and a known evaporation method, a coating film of a carbon nanotube structure forming method which is an electrode forming method of the present invention, or other methods can be employed.

(F) Other Steps

A capacitor using a coating film of a carbon nanotube structure as its electrode can be manufactured through the above steps. However, the capacitor manufacturing method of the present invention may include additional steps.

For instance, it is preferable to put a surface treatment step for pre-treatment of the base body surface before the coating step. The purpose of the surface treatment step is, for example, to enhance the absorption of the cross-linking application liquid to be applied, to enhance the adhesion between the base body surface and the carbon nanotube structure layer to be formed thereon, to clean the base body surface, or to adjust the electric conductivity of the base body surface.

An example of surface treatment for enhancing the absorption of the cross-linking application liquid is treatment by a silane coupling agent (e.g., aminopropyltriethoxysilane or γ-(2-aminoethyl) aminopropyltrimethoxysilane). Surface treatment by aminopropyltriethoxysilane is particularly widely employed and is preferable for the surface treatment step in the present invention. As documented by Y. L. Lyubchenko et al. in "Nucleic Acids Research vol. 21 (1993)" on pages 1117 to 1123, for example, surface treatment by aminopropyltriethoxysilane has conventionally been employed to treat the surface of a mica substrate for use in observation of AFM of DNA.

In the case where two or more carbon nanotube structure layers are to be layered, the operation of the carbon nanotube structure manufacturing method of the present invention is repeated twice or more. If an intermediate layer such as a dielectric layer or an insulating layer is to be interposed between carbon nanotube structure layers, a step for forming an intermediate layer is inserted in between repeating the operation of the capacitor manufacturing method of the present invention.

<Application Example of the Method of Manufacturing Carbon Nanotube Structure to be Used as Electrode According to the Present Invention>

In manufacturing a coating film of a carbon nanotube structure to be used as an electrode of a capacitor of the present invention, the carbon nanotube structure layer may be patterned on a surface of a temporary substrate and then transferred to a desired base body. It is also possible to modify this transfer step such that the patterned carbon nanotube structure layer is transferred from the temporary substrate to a surface of an intermediate transfer body and then to a desired base body (second base body).

The temporary substrate material that can be used in this application example is the same as the base body material described in the section[Carbon Nanotube Structure]. However, a temporary substrate that has at least one flat surface, more desirably, one that is shaped like a flat plate is preferable for transfer of the carbon nanotube structure layer in the transfer step.

To be employable in this application example, a base body or an intermediate transfer body has to have an adhesive surface holding, or capable of holding, an adhesive. Common tape such as cellophane tape, paper tape, cloth tape, or imide tape can be used in the application example. In addition to the tape and other materials that have plasticity or flexibility, rigid materials may also be employed as a base body or an intermediate transfer body. In the case of a material that does not come with an adhesive, an adhesive is applied to a surface of the material that can hold an adhesive, and then the material can be used in a similar fashion to normal adhesive tape.

According to this application example, the carbon nanotube structure to be used as an electrode according to the present invention can be manufactured with ease.

It is also possible to manufacture a coating film of a carbon nanotube structure by preparing a carbon nanotube structure layer that is carried on a surface of a base body and attaching the carbon nanotube structure layer along with the base body to a surface of a desired second body (for example, a housing) that constitutes a device.

A coating film of a carbon nanotube structure can be manufactured while skipping a cross-linking step if a carbon nanotube transfer body, which is a temporary substrate (or intermediate transfer body) carrying on its surface a carbon nanotube transfer layer, is used, the carbon nanotube structure layer alone is transferred to a surface of a base body that constitutes the carbon nanotube structure, and then the temporary substrate (or intermediate transfer body) is removed. Since the process is structured as such, the intermediate transfer body serves as a temporary substrate of the carbon nanotube transfer body in some cases. Those cases are included in the present invention because there is no need for the carbon nanotube transfer body to discriminate an intermediate transfer body from a temporary substrate.

When the carbon nanotube transfer body is employed, the carbon nanotube structure layer with carbon nanotubes cross-linked to one another is carried on the surface of the temporary substrate, and this makes the carbon nanotube structure layer very easy to handle in the subsequent steps. As a result, manufacture of a coating film of a carbon nanotube structure is greatly facilitated. To remove the temporary substrate, an appropriate method is chosen from mechanical peeling, chemical decomposition, burn-off, melting, sublimation, dissolution, and the like.

The carbon nanotube structure manufacturing method of this application example is effective particularly when a base body of a device has a material and/or shape that make it difficult to apply the method of manufacturing a carbon nanotube structure to be used as an electrode according to the present invention without some changes.

For instance, the application example of the present invention is effective when the temperature at which the applied liquid is cured in Cross-linking Step is equal to or higher than the melting point or glass transition temperature of the material that is to be used as a base body of the carbon nanotube structure. In this case, the heating temperature is set lower than the melting point of the temporary substrate to ensure a heating temperature necessary for the curing, and thus the carbon nanotube structure to be used an electrode according to the present invention can be manufactured appropriately.

To give another example, the application example of the present invention is effective also when Patterning Step takes a mode in which dry etching is performed on other regions of the carbon nanotube structure layer on the temporary substrate surface than the region to be patterned into a desired shape, thus removing the carbon nanotube structure layer from those regions and patterning the carbon nanotube structure layer into a pattern of the desired shape while the material that is to be used as a base body of the carbon nanotube structure is not resistant to dry etching of Patterning Step. In this case, a material resistant to dry etching is used as the temporary substrate so that the carbon nanotube structure can withstand Patterning Step on the temporary substrate, and thus the carbon nanotube structure to be used as an electrode according to the present invention can be manufactured appropriately.

Although specifics on resistance and material are varied depending on dry etching conditions including gas species, intensity, time, temperature, and pressure, resin materials have relatively low resistance to dry etching. When a resin material is used as the base body, limitations brought by low resistance of the resin material are lifted by employing this application example. Therefore, forming the base body from a resin material is preferable in that merits of this application example are brought out. On the other hand, inorganic materials which have relatively high resistance to dry etching are suitable for the temporary substrate. In general, plastic or flexible materials have low resistance to dry etching and therefore using one of such materials as the base body is preferable in that merits of this application example are brought out.

To give another example, the application example of the present invention is effective also when Patterning Step includes: Resist Layer Forming Step for forming a resist layer on the region of the carbon nanotube structure layer on the temporary substrate surface that is to be patterned into a desired shape; and Removal Step for bringing an etchant into contact with the side of the temporary substrate where the carbon nanotube structure layer and the resist layer are layered, thereby removing the carbon nanotube structure layer from the exposed regions of that are not covered with the resist layer while the base body has no resistance to the etchant used in Patterning Step whereas the temporary substrate is resistant to the etchant. In this case, the base body in this application example serves as a base body of the carbon nanotube structure and a material resistant to the etchant is used as the temporary substrate so that the carbon nanotube structure can withstand Patterning Step on the temporary substrate. Thus the carbon nanotube structure to be used as an electrode according to the present invention can be manufactured appropriately.

Specifics on resistance and material are varied depending on etching conditions including the type, concentration and temperature of the etchant used, how long the etchant is in contact with the carbon nanotube structure layer, and the like. When an acidic etchant is used and a base body of the carbon nanotube structure is to be formed from aluminum or like other materials that do not withstand acid, for example, limitations brought by low resistance of the base body material are lifted by employing this application example and using silicon or other materials that are resistant to acid as the temporary substrate. Limitations brought by low resistance are also lifted by using as the base body a material that has low resistance to an etchant as described above although depending on whether the etchant is acidic or alkaline.

The carbon nanotube structure to be used as an electrode according to the present invention is made easy to handle even more if a base body that carries a carbon nanotube structure layer 24 is pasted onto a second base body. The obtained carbon nanotube structure can be used to build a device. The second base body may be physically rigid or may be plastic or flexible, and can take various shapes including a spherical shape and a concave-convex shape.

A more specific description of the present invention is given below through Examples. However, the present invention is not limited to the following examples.

EXAMPLE 1

Figure 3:
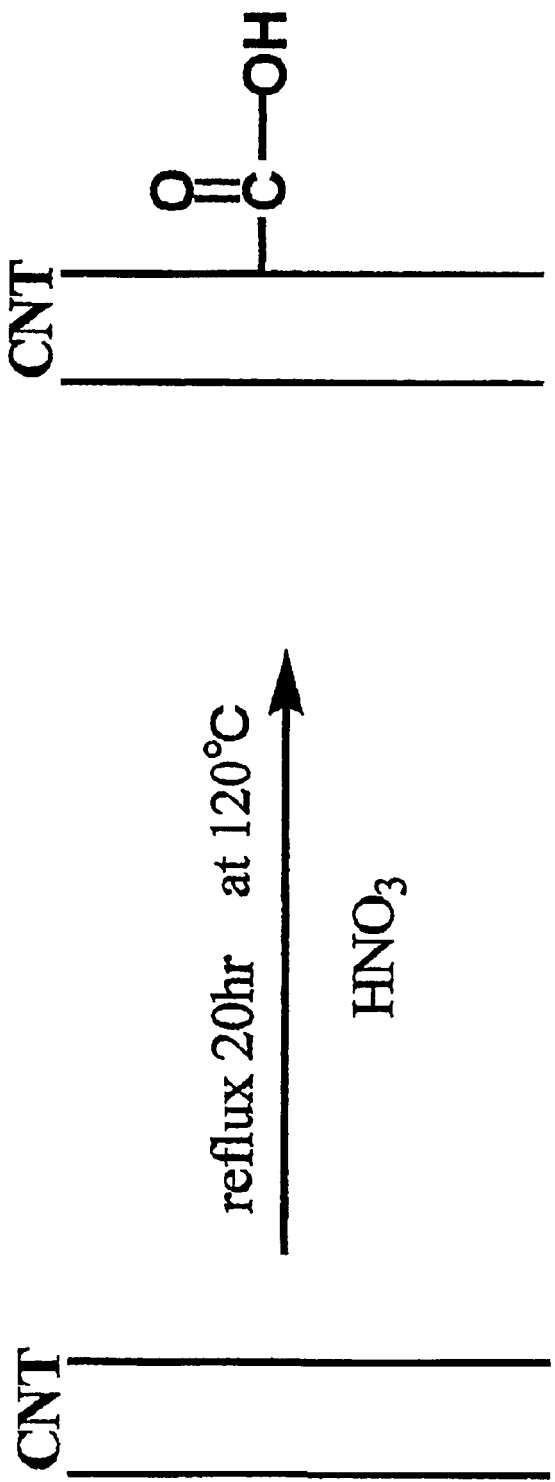
FIG. 3 is a reaction scheme for synthesis of carbon nanotube carboxylic acid in (Addition Step) in Example 1.

A capacitor was manufactured through a flow of the method of manufacturing a capacitor described above. It should be noted that reference numerals in FIG. 1 may be used in the description of this example.
(A) Coating Step for Coating
(A-1) Preparation of Cross-Linking Application Liquid (Addition Step)
(1) Addition of Carboxyl Group . . . Synthesis of Carbon Nanotube Carboxylic Acid 30 mg of single-wall carbon nanotube powder (purity: 90%, average diameter: 30 nm, average length: 3 $\mu$m, available from Science Laboratory Inc.) were added to 20 ml of concentrated nitric acid (a 60 mass % aqueous solution, available from KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and the liquid solution was centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate (the above process constitutes one washing operation). This washing operation was repeated five more times and lastly precipitate was recovered.

An infrared absorption spectrum of the recovered precipitate was measured. An infrared absorption spectrum of the used single-wall carbon nanotube raw material itself was also measured for comparison. A comparison between both the spectra revealed that absorption at 1735 cm$^{-1}$ characteristic of a carboxylic acid, which was not observed in the single-wall carbon nanotube raw material itself, was observed in the precipitate. This finding shows that a carboxyl group was introduced into a carbon nanotube by the reaction with nitric acid. In other words, this finding confirmed that the precipitate was a carbon nanotube carboxylic acid.

Figure 4:
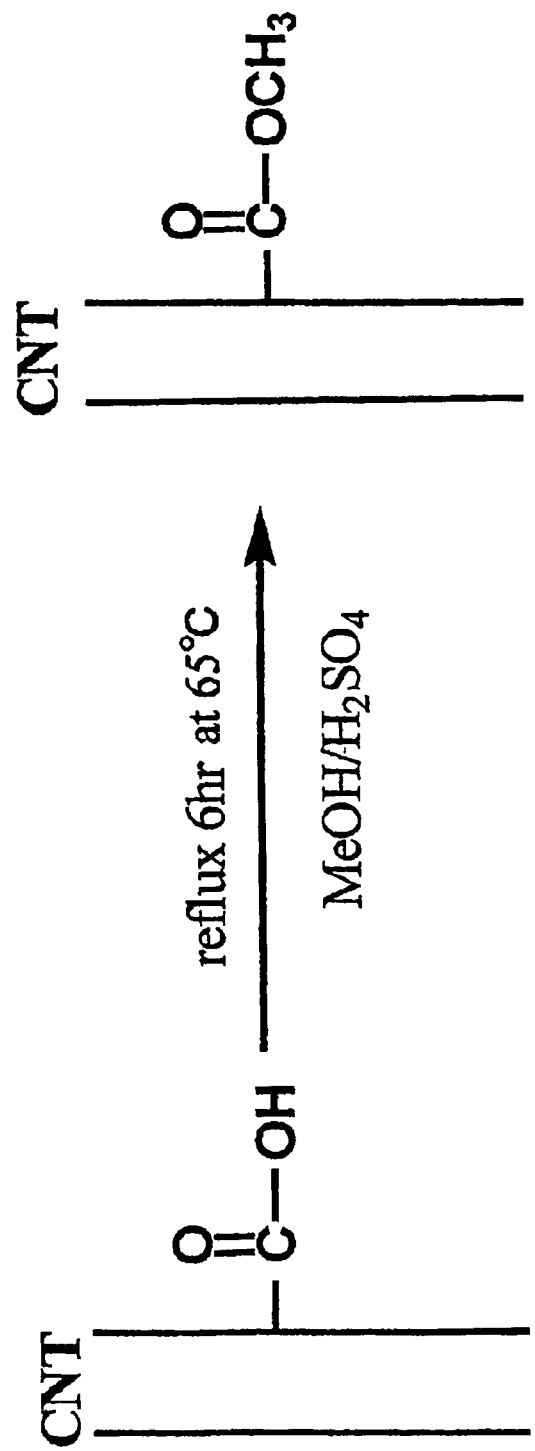
FIG. 4 is a reaction scheme for esterification in (Addition Step) in Example 1.
Figure 5:
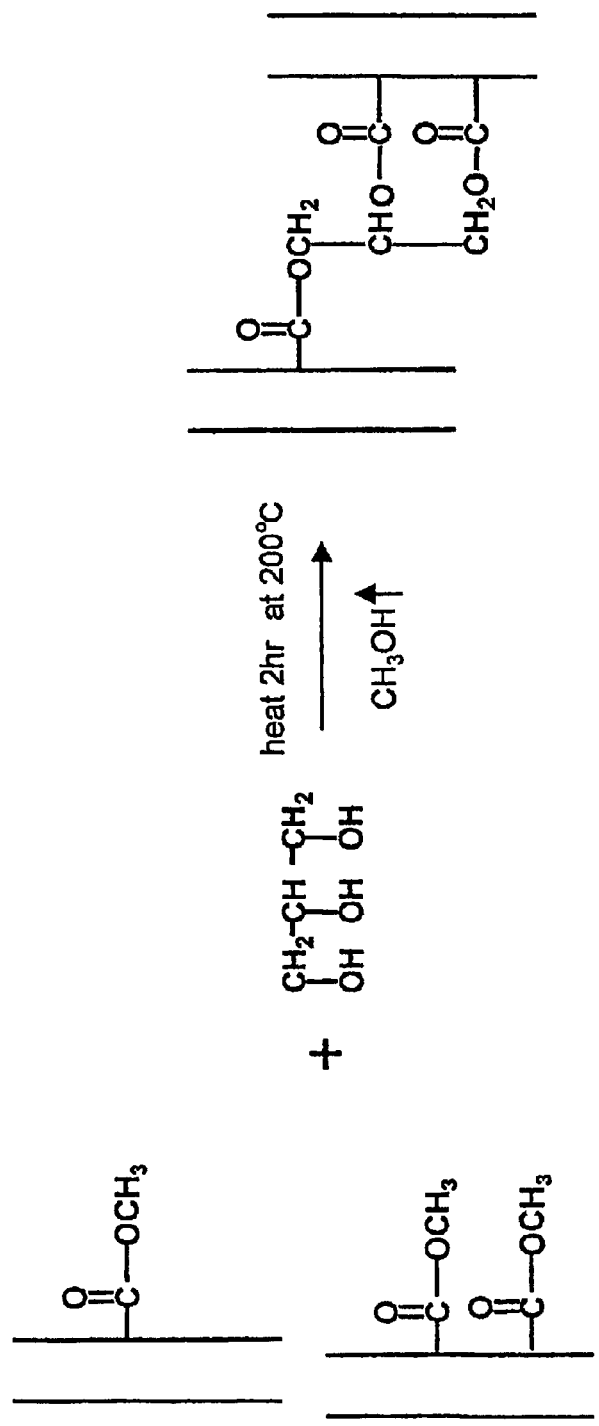
FIG. 5 is a reaction scheme for cross-linking through an ester exchange reaction in (Cross-linking Step) in Example 1.
Figure 6:
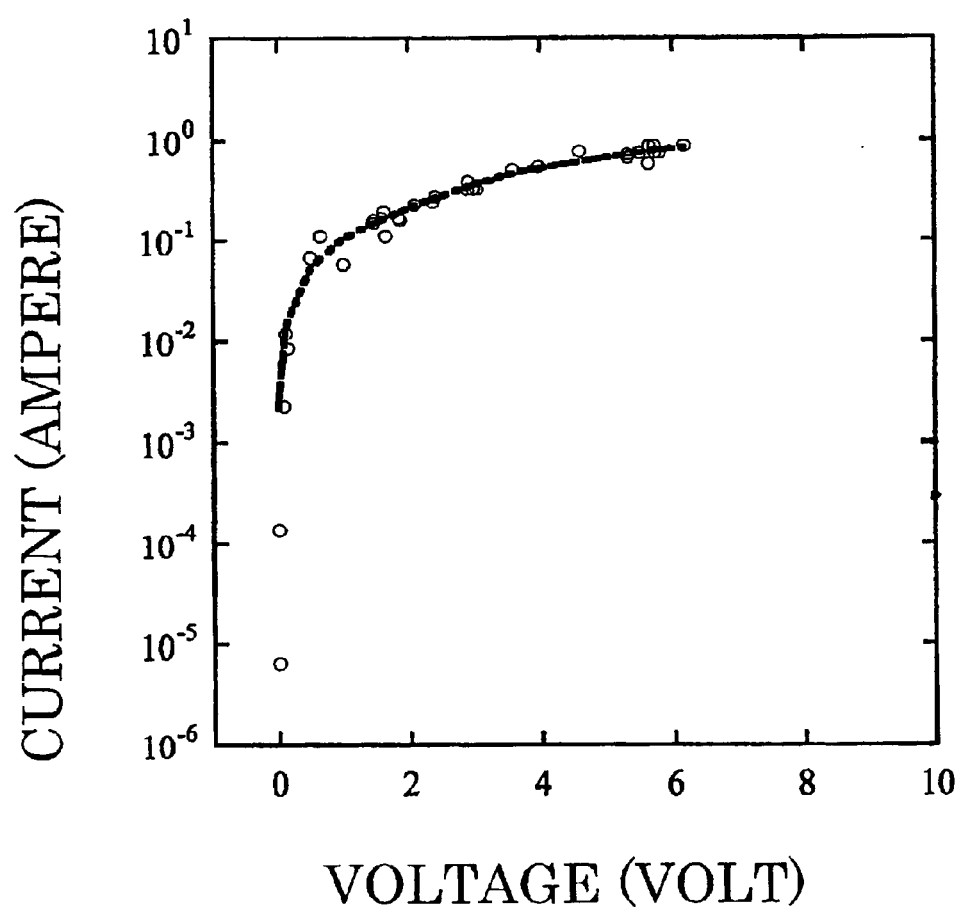
FIG. 6 is a graph showing results of measuring current-voltage characteristics of a carbon nanotube structure layer formed in Example 1.

Addition of the recovered precipitate to neutral pure water confirmed that dispensability was good. This result supports the result of the infrared absorption spectrum that a hydrophilic carboxyl group was introduced into a carbon nanotube.
(2) Esterification 30 mg of the carbon nanotube carboxylic acid prepared in the above step were added to 25 ml of methanol (available from Wako Pure Chemical Industries, Ltd.). Then, 5 ml of concentrated sulfuric acid (98 mass %, available from Wako Pure Chemical Industries, Ltd.) were added to the mixture, and reflux was conducted at 65° C. for 6 hours for methyl esterification. The reaction scheme for the above-mentioned methyl esterification is shown in FIG. 4.

After the temperature of the liquid solution had been recovered to room temperature, the liquid solution was filtered to separate a precipitate. The precipitate was washed with water, and was then recovered. An infrared absorption spectrum of the recovered precipitate was measured. As a result, absorption at 1,735 cm$^{-1}$ and that in the range of 1,000 to 1,300 cm$^{-1}$ characteristic of ester were observed. This result confirmed that the carbon nanotube carboxylic acid was esterified.

(Mixing Step)

30 mg of the carbon nanotube carboxylic acid methyl esterified in the above step were added to 4 g of glycerin (available from KANTO KAGAKU) and the whole was mixed using an ultrasonic disperser. Further, the mixture was added to 4 g of methanol as a viscosity adjuster to prepare a cross-linking application liquid (1).

(A-2) Surface Treatment Step of Substrate

Prepared was a silicon wafer (76.2 mmφ) (diameter of 3 inches), thickness of 380 μm, thickness of a surface oxide film of 1 μm, available from Advantech Co., Ltd) as a substrate 12 in which aluminum was deposited as a lower electrode 12 and a silicon oxide insulating film 13 was formed on one-side electrode by using an MOD coating material of silicon oxide (available from High Purity Chemicals Co., Ltd.). The silicon wafer was subjected to surface treatment using aminopropyltriethoxysilane for enhancing adsorption of the silicon wafer with respect to the cross-linking application liquid (1) to be applied to the wafer.

The silicon wafer was subjected to the surface treatment using aminopropyltriethoxysilane by exposing the silicon wafer to steam of 50 μl of aminopropyltriethoxysilane (available from Sigma-Aldrich Co.) for about 3 hours in a closed Schale.

(A-3) Coating Step

The cross-linking application liquid 11 (1 μl) prepared in Step (A-1) was coated to the surface of the silicon wafer subjected to the surface treatment using a spin coater (1H-DX2, manufactured by MIKASA Co., Ltd.) at 100 rpm for 30 seconds.

(B) Cross-linking Step

After the cross-linking application liquid had been applied, the tape 2 having formed thereon the coat was heated for 2 hours at 200° C. while being heated to cure the coat, thereby resulting in an upper electrode 14 composed of the carbon nanotube structure layer.

The condition of the resultant carbon nanotube structure layer (an upper electrode) 14 was observed using an optical microscope. As a result, an extremely uniform cured film was obtained. Furthermore, gold was deposited as a contact layer 15 on the cured film. As a result, a capacitor composed of a nanotube structure was obtained.

EXAMPLE 2

A similar method was employed to manufacture a capacitor with: an electrode formed from a coating film of a carbon nanotube structure, in which single-wall carbon nanotubes obtained by synthesizing carboxylic acid were cross-linked with the use of glycerin; and dielectric formed from an aluminum oxide film.

EXAMPLE 3

Manufactured in Example 3 was a capacitor with: an electrode formed from a coating film of a carbon nanotube structure, in which multi-wall carbon nanotubes obtained by synthesizing carboxylic acid were cross-linked with the use of hydroquinone; and dielectric formed from a silicon oxide film.

(Testing Experiment)

To test the present invention, the capacitors according to Examples 1 through 3 of the present invention as well as a commercially available electrolytic capacitor and ceramic capacitor were measured for frequency characteristics of equivalent series resistance (ESR) with an LCR meter 4284A (a product of Hewlett-Packard).

Figure 7:
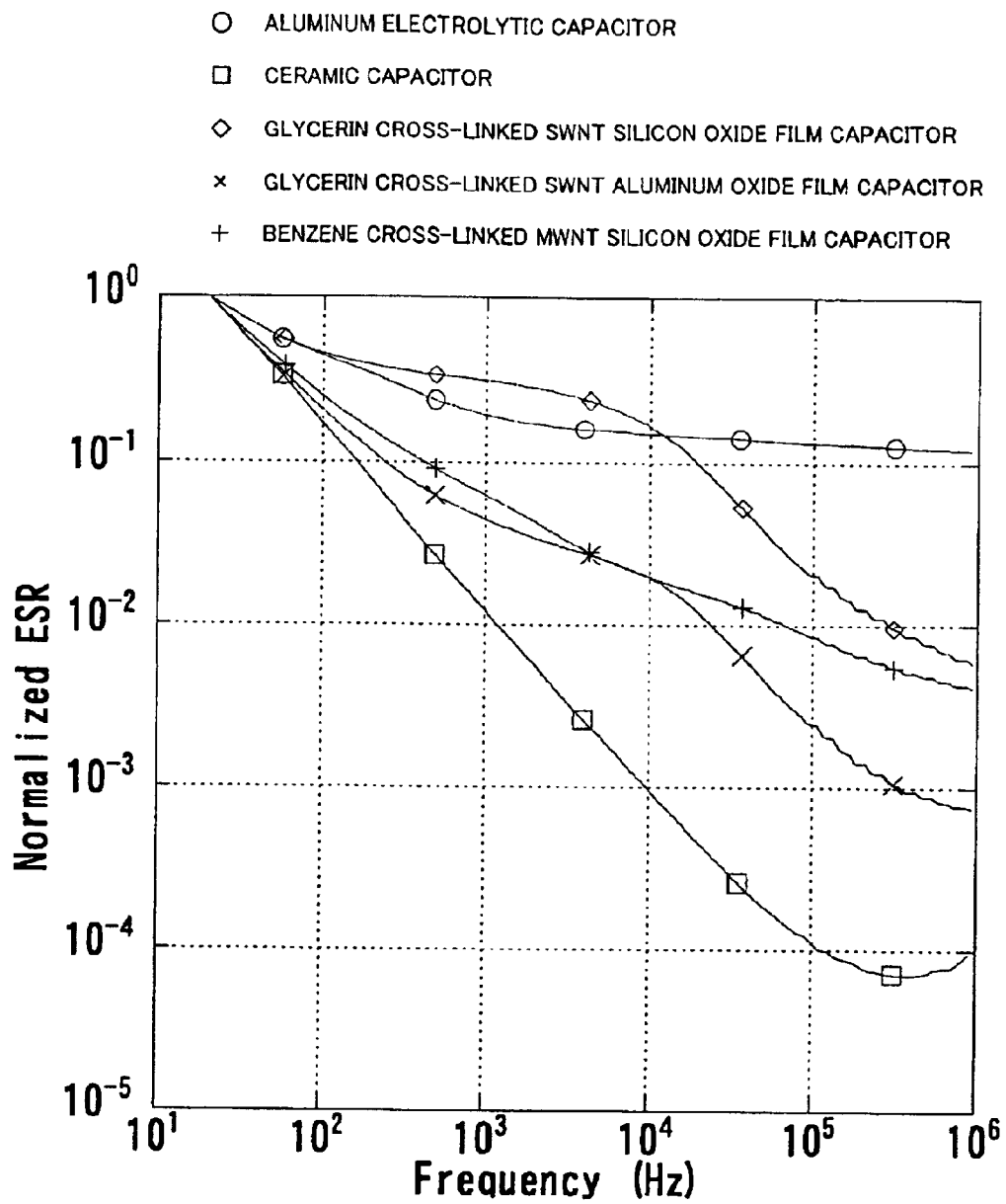
FIG. 7 is a graph showing frequency characteristics of ESR of cross-linked CNT capacitors obtained with the vertical axis indicating measured ESR values, which are normalized by ESR at 20 Hz.

Results of the measurement are shown in FIG. 7. The vertical axis indicates ESR values measured and normalized by ESR values at 20 Hz, which is the lowest measurement band. The ESR of the ceramic capacitor or the like is minimum around a frequency of 1 MHz whereas the frequency at which the ESR is minimum is over 1 MHz for any of the capacitors according to Examples of the present invention. This confirms that the capacitors of Examples of the present invention have excellent frequency characteristics.

According to the present invention, a capacitor has one or both of two opposing electrodes formed from a coating film of a carbon nanotube structure in which bonds between carbon nanotubes are solid enough to make the carbon nanotube structure a good conductor. The capacitor therefore has excellent frequency characteristics, uniformity, reproducibility, and mechanical characteristics, and is easy to perform fine machining on.

What is claimed is:

1. A capacitor comprising two opposing electrodes, at least one of the two electrodes being formed from a coating film of a carbon nanotube structure in which plural carbon nanotubes with functional groups bonded constitute a mesh structure by cross-linking the functional groups through chemical bonding.

2. A capacitor according to claim 1, wherein the carbon nanotube structure is manufactured by curing a solution containing plural carbon nanotubes to which functional groups are bonded, and by chemically bonding the plural functional groups bonded to the carbon nanotubes to form a cross-linked site.

3. A capacitor according to claim 2, wherein the cross-linked site is structured by cross-linking the plural functional groups with a cross-linking agent in the solution, and the cross-linking agent is not self-polymerizable.

4. A capacitor according to claim 1, wherein the cross-linked site where plural carbon nanotubes mutually cross-link has a chemical structure selected from the group consisting of —COO(CH$_2$)$_2$OCO—, —COOCH$_2$CHOHCH$_2$OCO—, —COOCH$_2$CH(OCO—)CH$_2$OH, and —COOCH$_2$CH(OCO—)CH$_2$OCO—.

5. A capacitor according to claim 2, wherein the cross-linked site is formed through chemical bonding of the plural functional groups.

6. A capacitor according to claim 5, wherein a reaction forming the chemical bonding is selected from the group consisting of dehydration condensation, a substitution reaction, an addition reaction, and an oxidative reaction.

7. A capacitor according to claim 1, wherein the cross-linked site where plural carbon nanotubes mutually cross-link has a chemical structure selected from the group consisting of —COOCO—, —O—, —NHCO—, —COO—, —NCH—, —NH—, —S—, —O—, —NHCOO—, and —S—S—.

8. A capacitor according to claim 1, wherein the plural carbon nanotubes are multi-wall carbon nanotubes.

9. A method of manufacturing a capacitor that has two opposing electrodes comprising:

a coating step for coating a surface of a base body with a solution that contains plural carbon nanotubes with functional groups bonded; and a cross-linking step for forming a carbon nanotube structure layer in which the functional groups are chemically bonded to one another, thereby causing the carbon nanotubes to cross-link to one another and build a mesh structure, wherein the carbon nanotube structure layer constitutes one or both of the opposing electrodes.

10. A method of manufacturing a capacitor according to claim 9, wherein:

the solution contains a cross-linking agent that cross-links the plural functional groups together; and the cross-linking agent is not self-polymerizable.

11. A method of manufacturing a capacitor according to claim 10, wherein:

each of the functional groups is selected from the group consisting of —OH, —COOH, —COOR (where R represents a substituted or unsubstituted hydrocarbon group), —COX (where X represents a halogen atom), —NH$_2$, and —NCO; and the cross-linking agent is capable of prompting a cross-linking reaction with the selected functional groups.

12. A method of manufacturing a capacitor according to claim 10, wherein:

the cross-linking agent is selected from the group consisting of a polyol, a polyamine, a polycarboxylic acid, a polycarboxylate, a polycarboxylic acid halide, a polycarbodiimide, and a polyisocyanate; and each of the functional groups is capable of prompting a cross-linking reaction with the selected cross-linking agent.

13. A method of manufacturing a capacitor according to claim 10, wherein:

each of the functional groups is selected from the group consisting of —OH, —COOH, —COOR (where R represents a substituted or unsubstituted hydrocarbon group), —COX (where X represents a halogen atom), —NH$_2$, and —NCO;

the cross-linking agent is selected from the group consisting of a polyol, a polyamine, a polycarboxylic acid, a polycarboxylate, a polycarboxylic acid halide, a polycarbodiimide, and a polyisocyanate; and the functional groups and the cross-linking agent are respectively selected for a combination capable of prompting a mutual cross-linking reaction.

14. A method of manufacturing a capacitor according to claim 11, wherein each of the functional groups is —COOR (where R represents a substituted or unsubstituted hydrocarbon group).

15. A method of manufacturing a capacitor according to claim 14, wherein the cross-linking agent is a polyol.

16. A method of manufacturing a capacitor according to claim 14, wherein the cross-linking agent is selected from the group consisting of glycerin, ethylene glycol, butenediol, hexynediol, hydroquinone, and naphthalenediol.

17. A method of manufacturing a capacitor according to claim 9, wherein the solution further contains a solvent.

18. A method of manufacturing a capacitor according to claim 17, wherein the cross-linking agent also functions as a solvent.

19. A method of manufacturing a capacitor according to claim 9, wherein a reaction forming the chemical bonding is a reaction for chemically bonding the plural functional groups.

20. A method of manufacturing a capacitor according to claim 19, wherein the solution further contains an additive that chemically bonds the plural functional groups.

21. A method of manufacturing a capacitor according to claim 20, wherein the reaction is dehydration condensation and the additive is a condensation agent.

22. A method of manufacturing a capacitor according to claim 21, wherein each of the functional groups is selected from the group consisting of —COOR (where R represents a substituted or unsubstituted hydrocarbon group), —COOH, —COX (where X represents a halogen atom), —OH, —CHO—, and —NH$_2$.

23. A method of manufacturing a capacitor according to claim 22, wherein each of the functional groups is —COOH.

24. A method of manufacturing a capacitor according to claim 21, wherein the condensation agent is selected from the group consisting of sulfuric acid, N-ethyl-N'-(3-dimethylaminopropyl)carbodiimide, and dicyclohexyl carbodiimide.

25. A method of manufacturing a capacitor according to claim 20, wherein the reaction is a substitution reaction and the additive is a base.

26. A method of manufacturing a capacitor according to claim 25, wherein each of the functional groups is selected from the group consisting of —NH$_2$, —X (where X represents a halogen atom), —SH, —OH, —OSO$_2$CH$_3$, and —OSO$_2$(C$_6$H$_4$)CH$_3$.

27. A method of manufacturing a capacitor according to claim 25, wherein the base is selected from the group consisting of sodium hydroxide, potassium hydroxide, pyridine, and sodium ethoxide.

28. A method of manufacturing a capacitor according to claim 19, wherein the reaction is an addition reaction.

29. A method of manufacturing a capacitor according to claim 28, wherein each of the functional groups is selected from the group consisting of —OH and —NCO.

30. A method of manufacturing a capacitor according to claim 19, wherein the reaction is an oxidative reaction.

31. A method of manufacturing a capacitor according to claim 30, wherein each of the functional groups is —SH.

32. A method of manufacturing a capacitor according to claim 30, wherein the solution further contains an oxidative reaction accelerator.

33. A method of manufacturing a capacitor according to claim 32, wherein the oxidative reaction accelerator is iodine.

* * * * *